United States Patent
Osada

(10) Patent No.: US 8,083,195 B2
(45) Date of Patent: Dec. 27, 2011

(54) CRADLE DEVICE AND ELECTRONIC EQUIPMENT SUPPORT DEVICE

(75) Inventor: Yasuo Osada, Saitama (JP)

(73) Assignee: Sony Corporation, Tokyo (JP)

( * ) Notice: Subject to any disclaimer, the term of this patent is extended or adjusted under 35 U.S.C. 154(b) by 964 days.

(21) Appl. No.: 12/044,247

(22) Filed: Mar. 7, 2008

(65) Prior Publication Data

US 2008/0237416 A1    Oct. 2, 2008

(30) Foreign Application Priority Data

Mar. 30, 2007  (JP) ................................ 2007-094756

(51) Int. Cl.
    *F16M 11/00*    (2006.01)

(52) U.S. Cl. ............ 248/274.1; 248/176.1; 361/679.58; 439/157

(58) Field of Classification Search ............... 248/176.1, 248/274.1; 361/679.41, 679.56, 727, 679.55, 361/679.57, 679.58; 439/157, 372
    See application file for complete search history.

(56) References Cited

U.S. PATENT DOCUMENTS

| | | | |
|---|---|---|---|
| 6,193,546 B1 * | 2/2001 | Sadler | 439/534 |
| 6,483,698 B1 * | 11/2002 | Loh | 361/679.41 |
| 6,716,058 B2 * | 4/2004 | Youn | 439/535 |
| 6,961,237 B2 * | 11/2005 | Dickie | 361/679.04 |
| 7,014,486 B1 * | 3/2006 | Wu et al. | 439/248 |
| 7,639,482 B1 * | 12/2009 | Griffin | 361/679.1 |
| 7,719,830 B2 * | 5/2010 | Howarth et al. | 361/679.41 |
| 2006/0044752 A1 * | 3/2006 | Lin et al. | 361/686 |
| 2006/0250764 A1 * | 11/2006 | Howarth et al. | 361/683 |

FOREIGN PATENT DOCUMENTS

| | | |
|---|---|---|
| JP | 2003-283609 | 10/2003 |
| JP | 2003-298249 | 10/2003 |
| JP | 2003-309637 | 10/2003 |
| JP | 2004-135119 | 4/2004 |
| JP | 2004-159409 | 6/2004 |
| JP | 2006-4261 | 1/2006 |
| JP | 2006-320063 | 11/2006 |

* cited by examiner

*Primary Examiner* — Terrell McKinnon
*Assistant Examiner* — Daniel J Breslin
(74) *Attorney, Agent, or Firm* — Oblon, Spivak, McClelland, Maier & Neustadt, L.L.P.

(57) ABSTRACT

There is provided a cradle device including: a connector to which electronic equipment is electrically and detachably connected; a support member having a support supporting a side of the electronic equipment connected to the connector and a brake provided integrally with the support; and a support member fixing mechanism supporting the support member to be movable closer to or away from the electronic equipment connected to the connector and holding the brake to prevent movement of the support member when an external force is applied to a certain region of the support.

9 Claims, 22 Drawing Sheets

CRADLE DEVICE AND ELECTRONIC EQUIPMENT SUPPORT DEVICE

CROSS REFERENCES TO RELATED APPLICATIONS

The present invention contains subject matter related to Japanese Patent Application JP 2007-094756 filed in the Japanese Patent Office on Mar. 30, 2007, the entire contents of which being incorporated herein by reference.

BACKGROUND OF THE INVENTION

1. Field of the Invention

The invention relates to a cradle device that has a connector to which electronic equipment such as a portable telephone, PHS (Personal Handy-phone System), or portable music player is electrically connected, and may charge a portable power supply unit included in the electronic equipment and may reproduce music with high sound quality, and an electronic equipment support device supporting the electronic equipment.

2. Description of the Related Art

Japanese Unexamined Patent Application Publication No. 2006-4261 discloses an example of such a cradle device of the related art. Japanese Unexamined Patent Application Publication No. 2006-4261 discloses a portable information terminal such as a PDA (Personal Digital Assistant) terminal, digital camera, or portable telephone and a cradle device for the portable information terminal, and an information terminal system including the portable information terminal and the cradle device. The cradle device disclosed in Japanese Unexamined Patent Application Publication No. 2006-4261 "includes a first mounting part to mount a portable information terminal at a first position; a second mounting part differing from the first mounting part to mount the portable information terminal at a second position; a first processing device performing first processing for the portable information terminal; and a second processing device performing second processing for the portable information terminal, where the first processing is performed when the portable information terminal is mounted on the first mounting part and the second processing is performed when the portable information terminal is mounted on the second mounting part."

It is expected that the cradle device having such a configuration "may perform different processing operations depending on a position or attitude of the portable information terminal mounted on the cradle device" (paragraph [0018] of the specification), for example.

Japanese Unexamined Patent Application Publication No. 2003-283609 discloses another example of a cradle device of the related art. Japanese Unexamined Patent Application Publication No. 2003-283609 discloses a portable telephone system, a portable telephone terminal, a charger, and a music reproduction method used in them. The charger disclosed in Japanese Unexamined Patent Application Publication No. 2003-283609 is a "charger charging a portable telephone terminal that may reproduce music data through a charging terminal, where reproduced sound of music data stored in the portable telephone terminal is sounded from a built-in speaker when input through the charging terminal."

It is expected that in the charger having such a configuration, "reproduced sound of music data stored in the portable telephone terminal is sent to the charger through the charging terminal to charge the portable telephone terminal and the reproduced sound is sounded from the speaker in the charger, so that a user may listen to music data with high sound quality without impairing convenience of the user."

SUMMARY OF THE INVENTION

However, in the cradle device disclosed in Japanese Unexamined Patent Application Publication No. 2006-4261, one charger has a plurality of mounting parts to perform different types of processing according to a position or attitude of a mounted portable telephone terminal, and a mounting part is selected according to a type of intended processing. Therefore, it may be necessary to prepare connectors as many as the mounting parts, so that the cradle device has many components, uneconomically, and the charger is increased in size, disadvantageously.

Further, the charger disclosed in Japanese Unexamined Patent Application Publication No. 2006-283609 has a mounting surface larger than a portable telephone terminal, and the portable telephone terminal is mounted on the charger by laying the terminal on the mounting surface. Therefore, the charger is extremely large and the cradle device does not meet a demand for reduction in size as a whole, disadvantageously.

Embodiments of the invention have attempted to provide a cradle device and an electronic equipment support device, where the cradle device has only one connector and therefore may be reduced in size as a whole and move a support member smoothly, and the device may support stably and surely and prevent movement of enclosures of electronic equipment having an identical connector, respectively, even if the enclosures vary in dimensions such as thickness and width.

According to an embodiment of the invention, there is provided a cradle device including: a connector to which electronic equipment is electrically and detachably connected; a support member having a support supporting a side of the electronic equipment connected to the connector and a brake provided integrally with the support; and a support member fixing mechanism supporting the support member to be movable closer to or away from the electronic equipment connected to the connector and holding the brake to prevent movement of the support member when an external force is applied to a certain region of the support.

According to an embodiment of the invention, there is provided an electronic equipment support device including: a support member having a support supporting a side of electronic equipment and a brake provided integrally with the support; and a support member fixing mechanism supporting the support member to be movable closer to or away from the electronic equipment and holding the brake to prevent movement of the support member when an external force is applied to a certain region of the support.

BRIEF DESCRIPTION OF THE DRAWINGS

FIG. 3 shows a first example of a cradle device according to an embodiment of the invention, where

FIG. 4 shows a first example of a cradle device according to an embodiment of the invention, where

FIG. 8 shows a first example of a support member fixing mechanism in accordance with a cradle device according to an embodiment of the invention, where

FIG. 17 shows a second example of a support member fixing mechanism in accordance with a cradle device according to an embodiment of the invention, where

FIG. 22 shows a fifth example of a support member fixing mechanism in accordance with a cradle device according to an embodiment of the invention, where

DESCRIPTION OF THE PREFERRED EMBODIMENTS

A cradle device and an electronic equipment support device are realized with a simple configuration, where the device has a support member fixing mechanism holding a brake of a support member to prevent movement of the support member when an external force is applied to a certain region of a support of the support member, so that the device may surely support electronic equipment at a predetermined position, charge the electronic equipment, and output sound signals from the electronic equipment to reproduce music with high sound quality.

Figure 1:
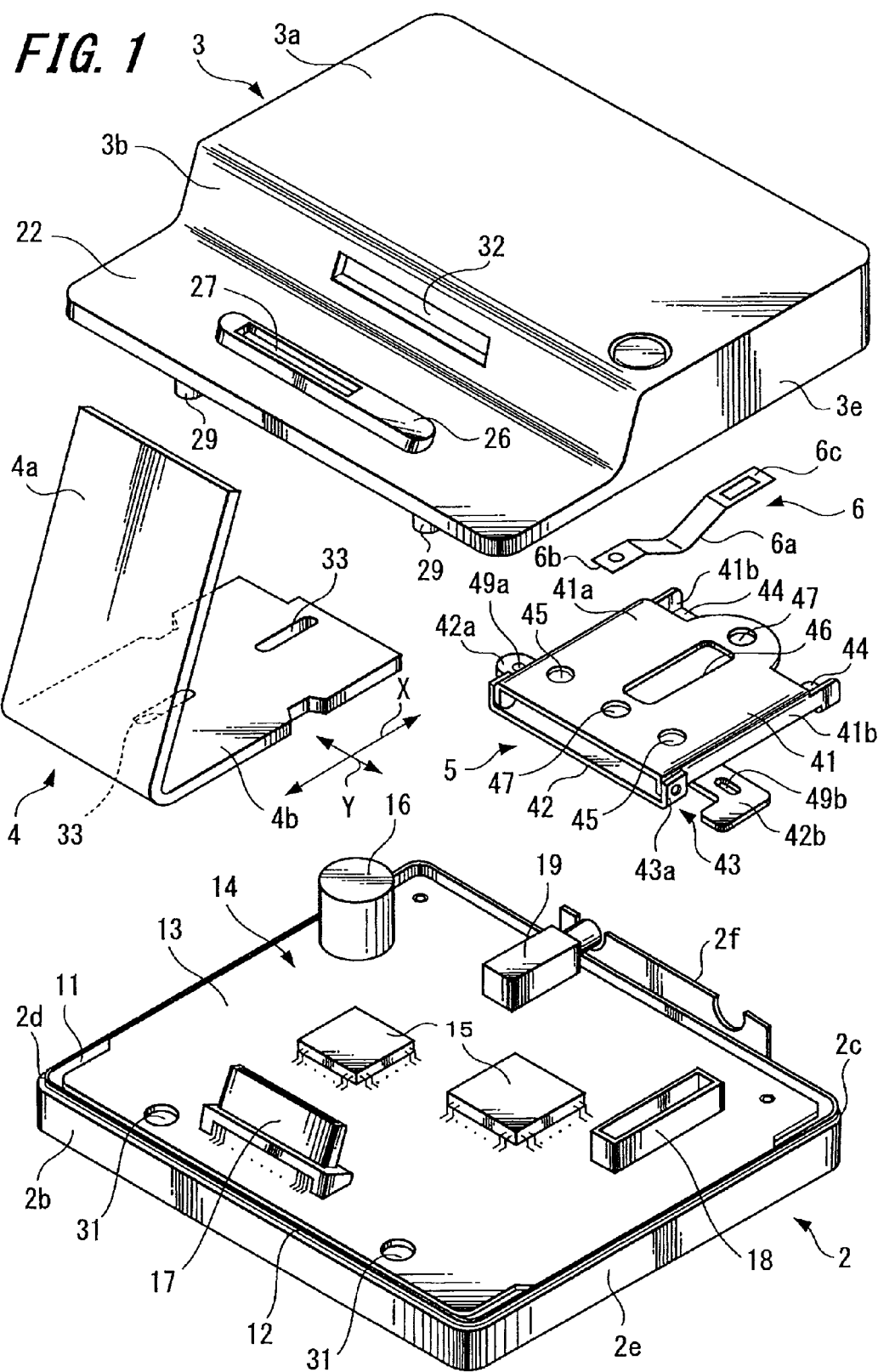
FIG. 1 is an exploded perspective view showing a first example of a cradle device according to an embodiment of the invention.
Figure 2:
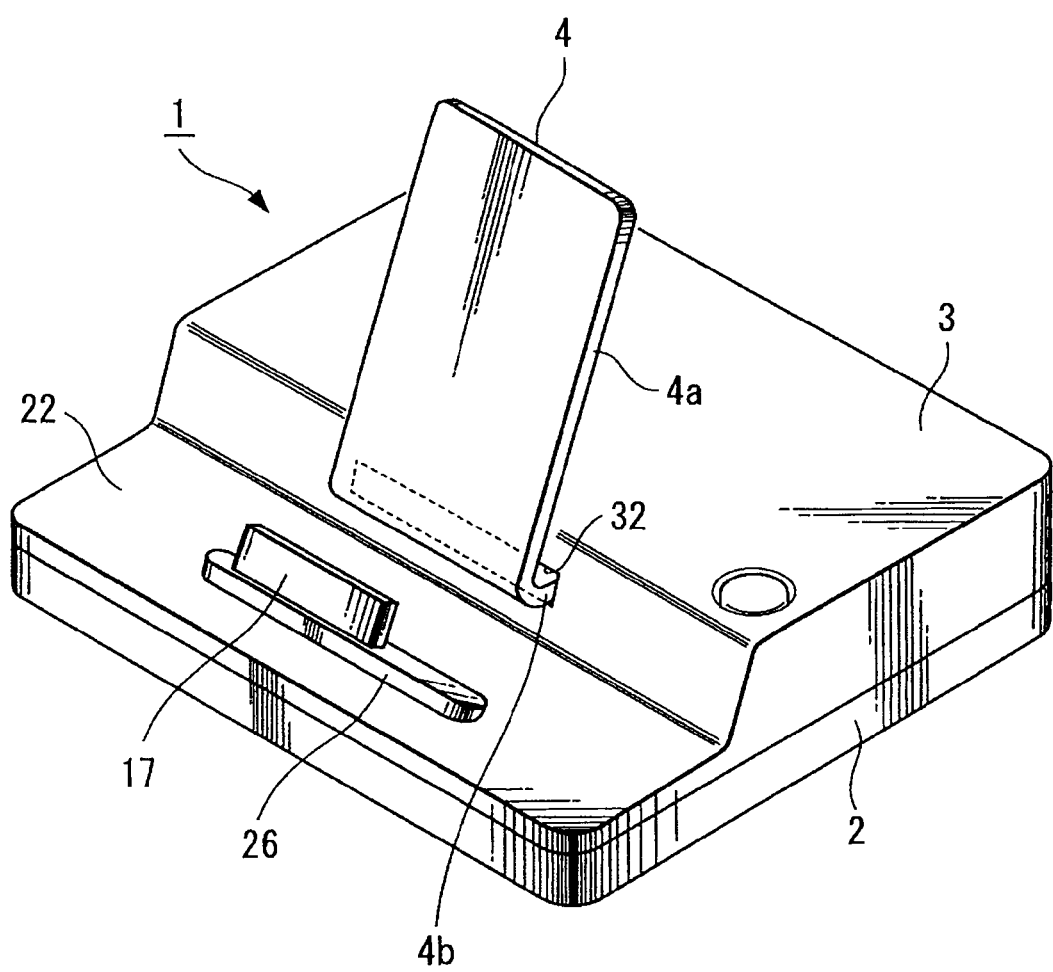
FIG. 2 is an assembly perspective view showing a first example of a cradle device according to an embodiment of the invention.
Figure 3A:
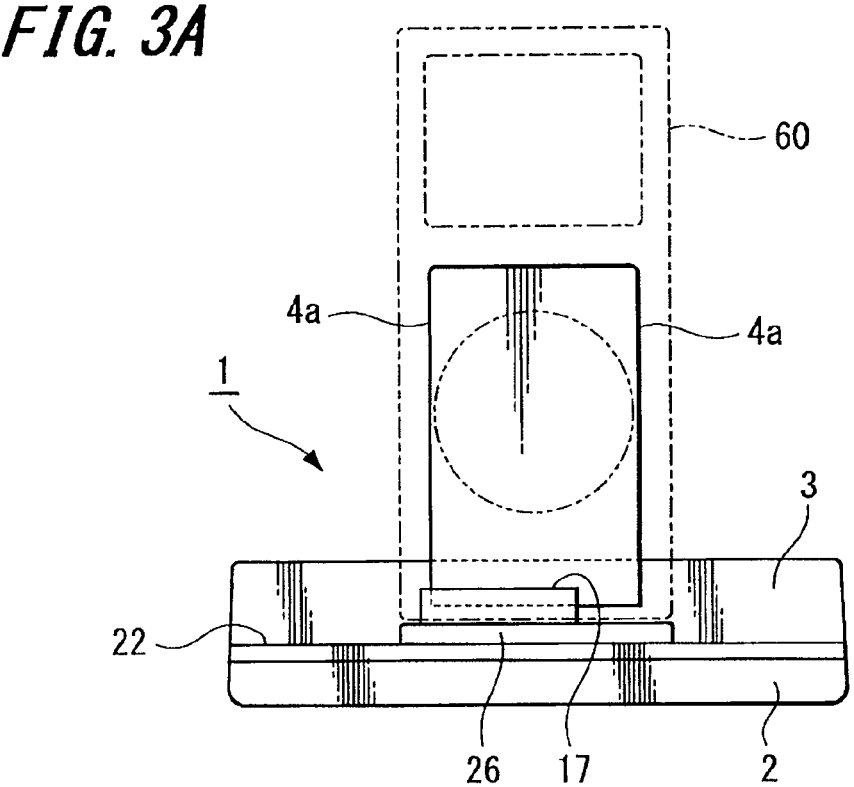
FIG. 3A is a front view and FIG. 3B is a rear view.
Figure 3B:
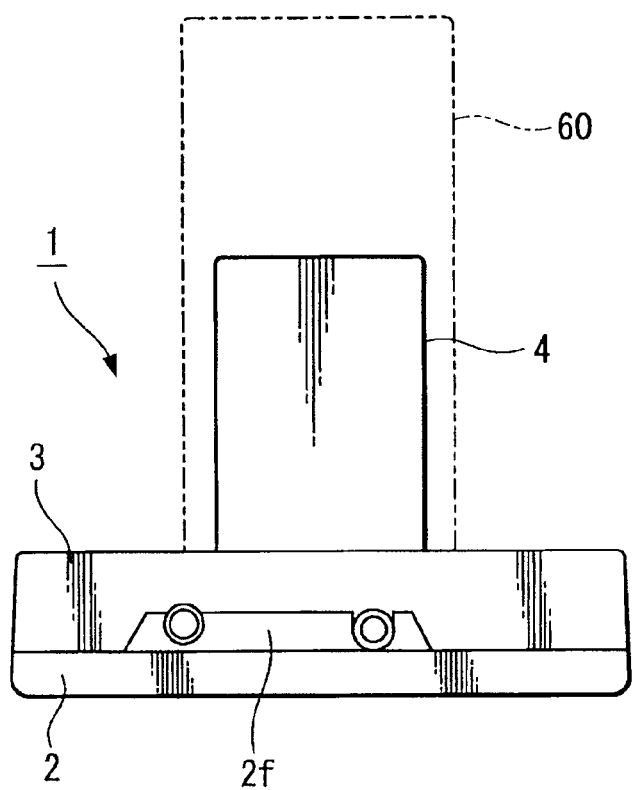
Figure 4A:
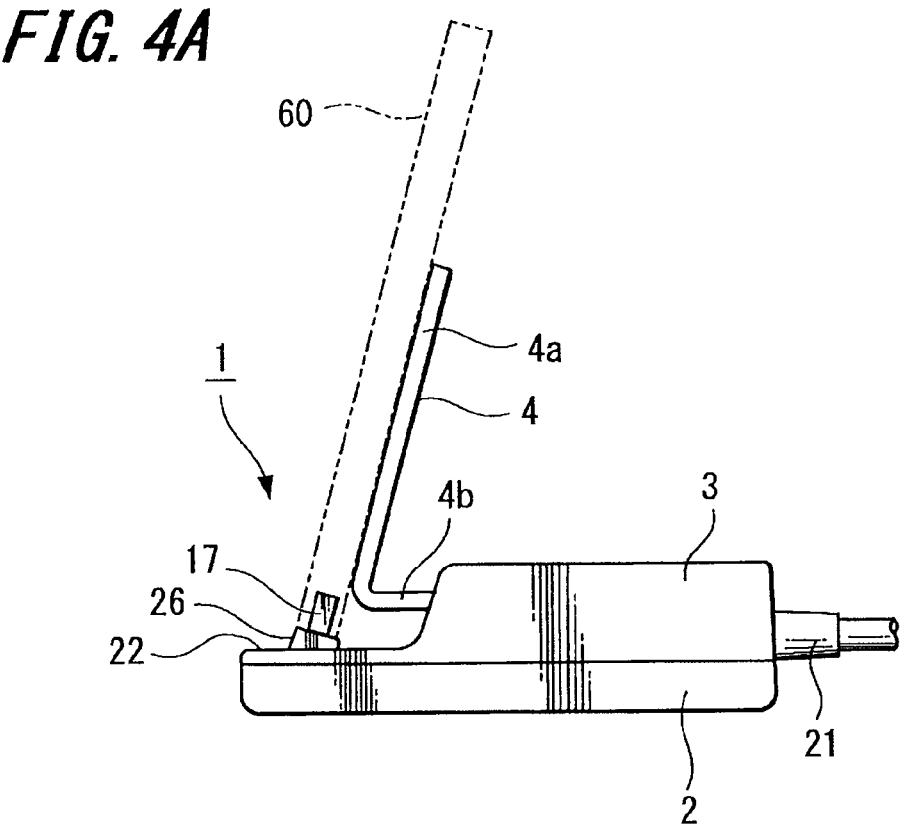
FIG. 4A is a right side view and FIG. 4B is a plan view.
Figure 4B:
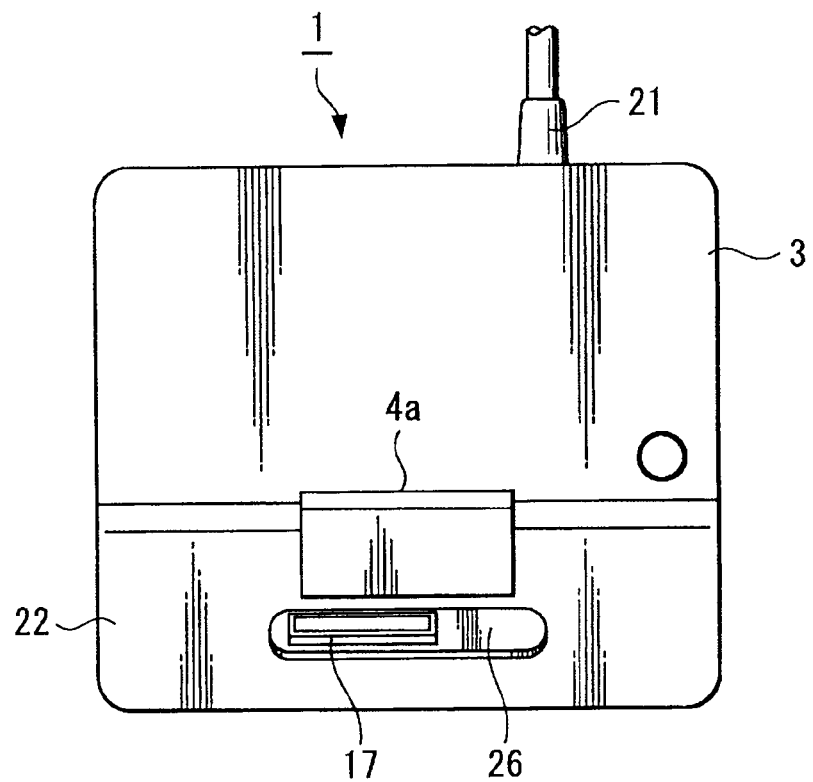
Figure 5:
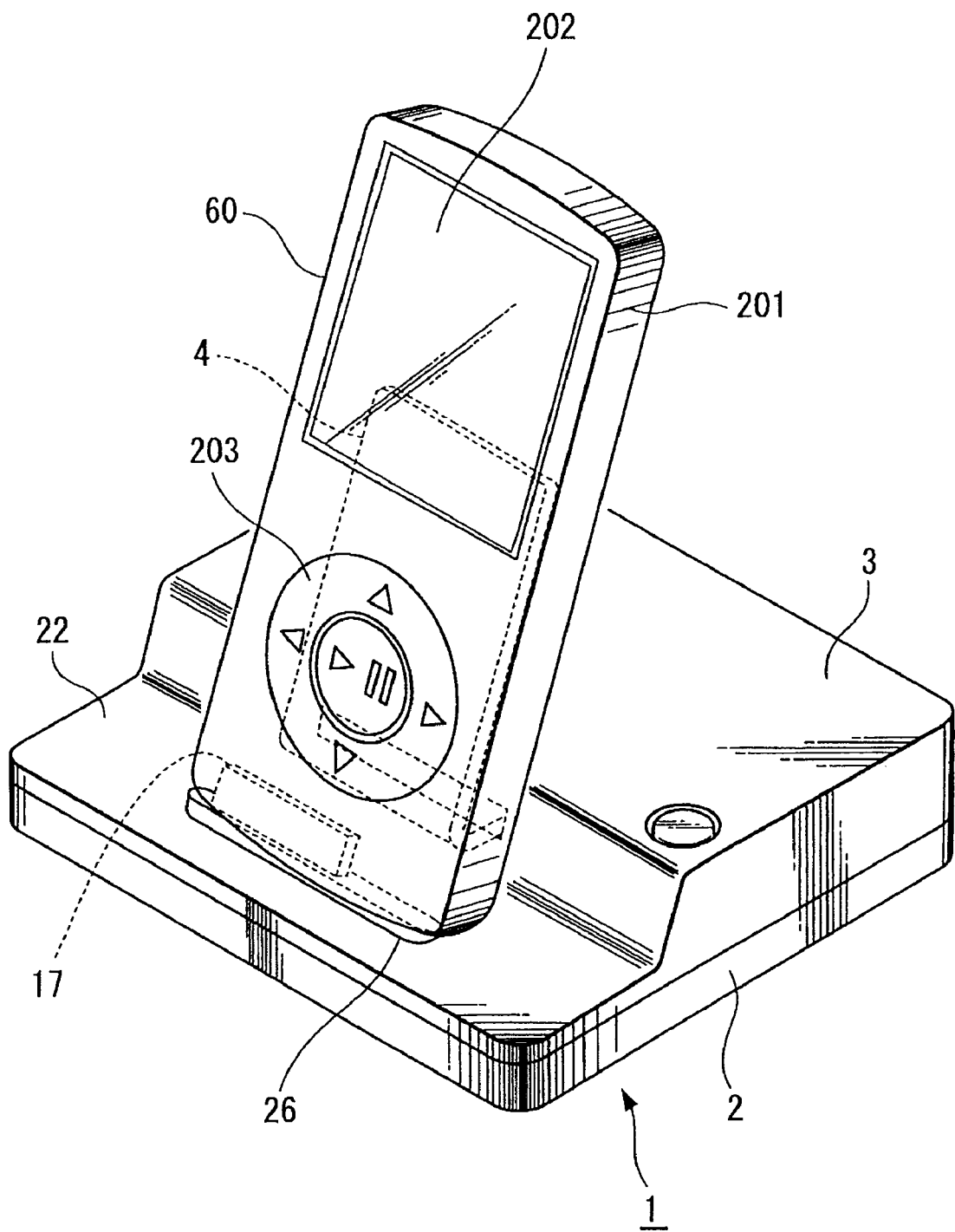
FIG. 5 is a view describing a state where thin electronic equipment is mounted on a cradle device according to an embodiment of the invention.
Figure 6:
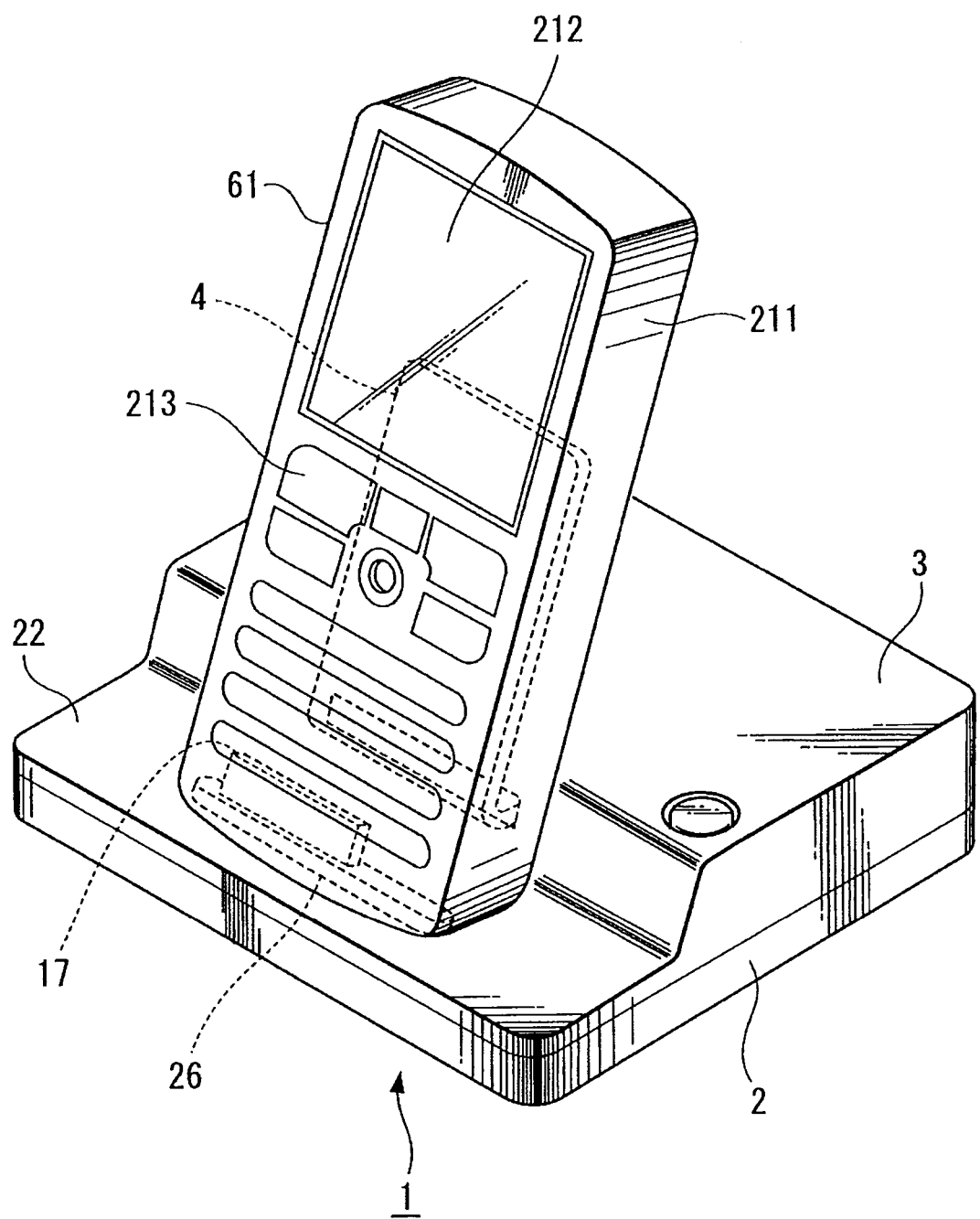
FIG. 6 is a view describing a state where thick electronic equipment is mounted on a cradle device according to an embodiment of the invention.
Figure 7:
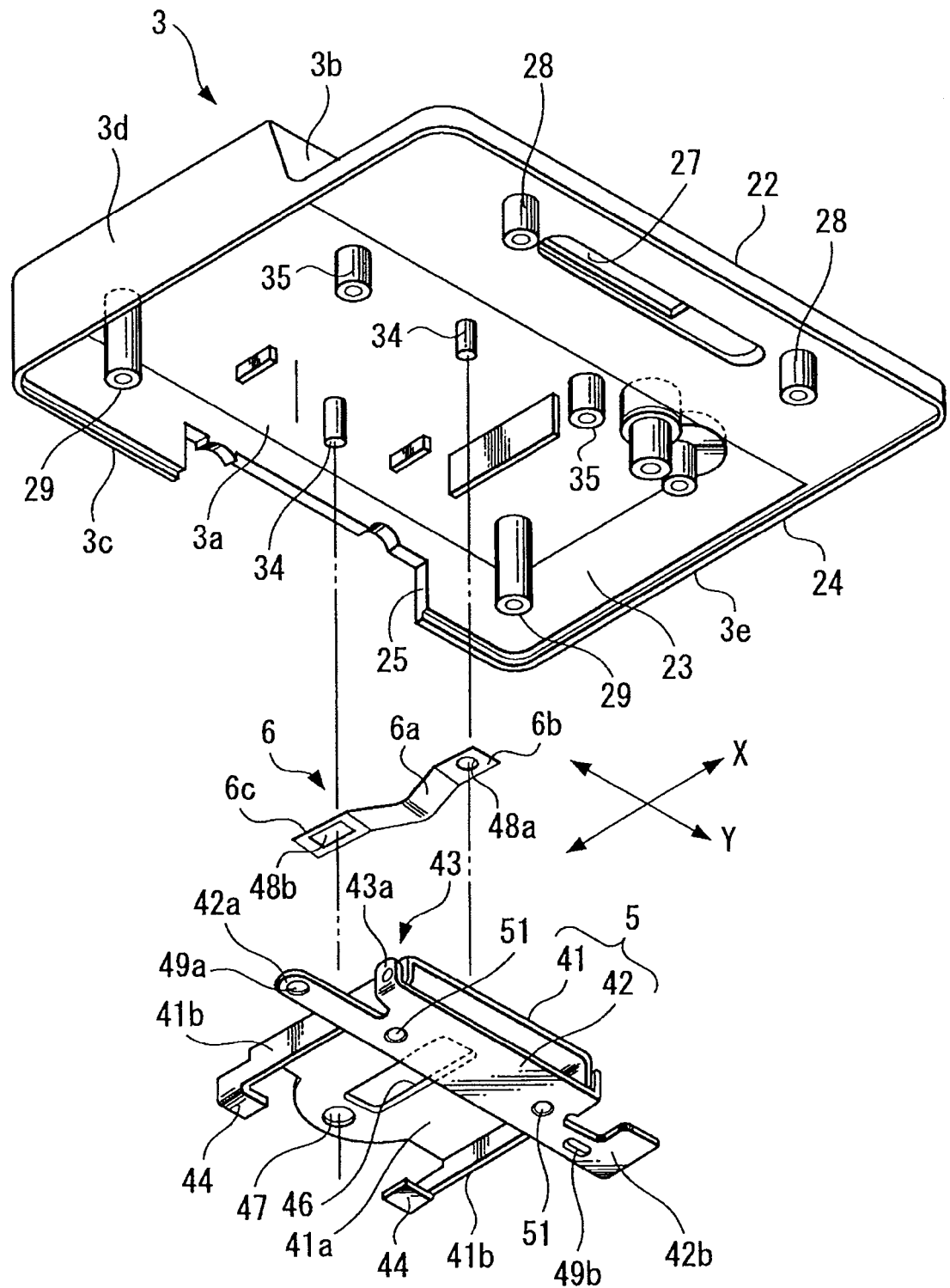
FIG. 7 is a perspective view from below of an upper case, a plate spring, and a holding member of a cradle device according to an embodiment of the invention.
Figure 8A:
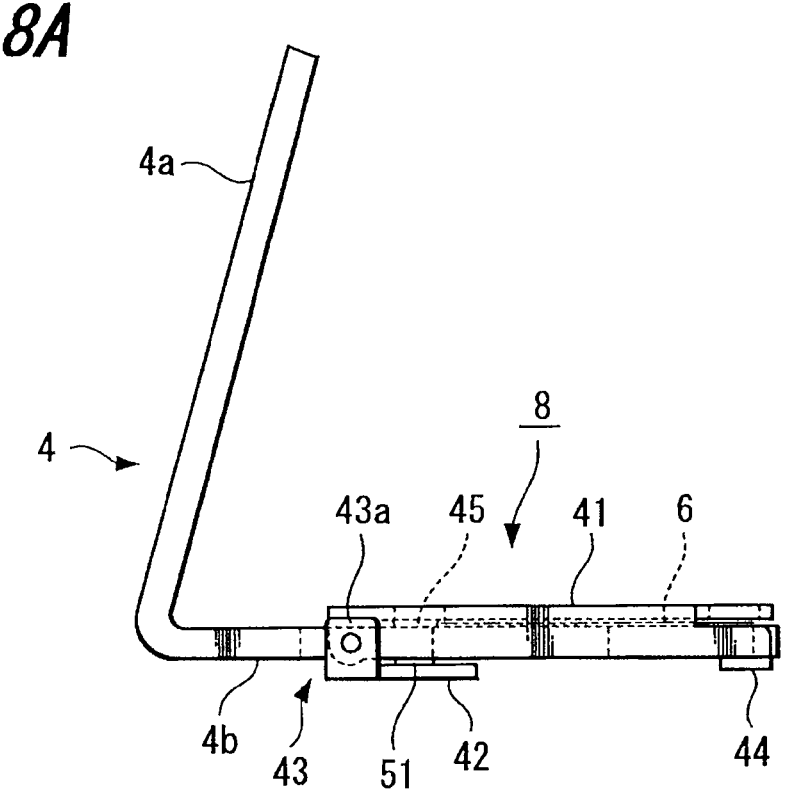
FIG. 8A is a right side view and FIG. 8B is a front view.
Figure 8B:
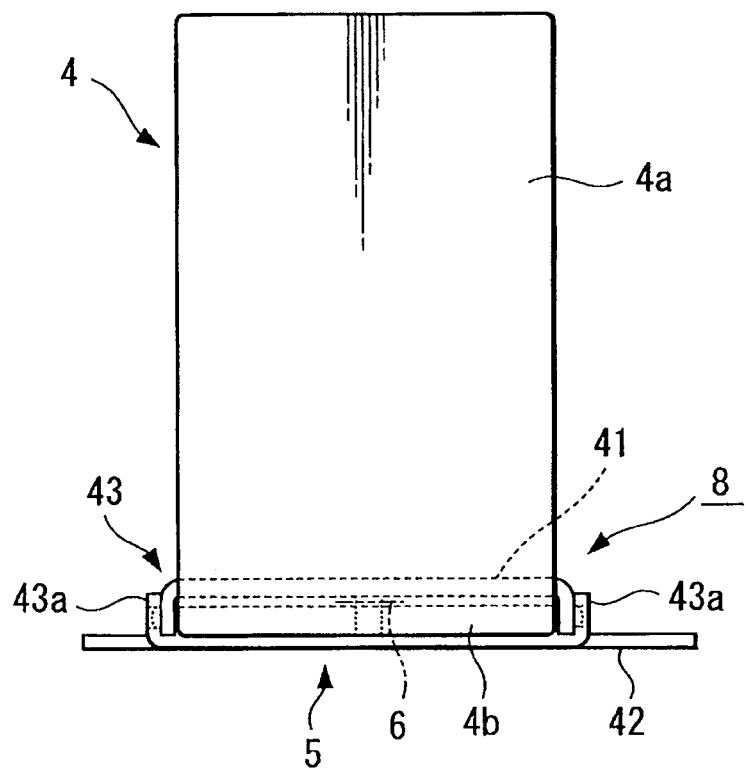
Figure 9:
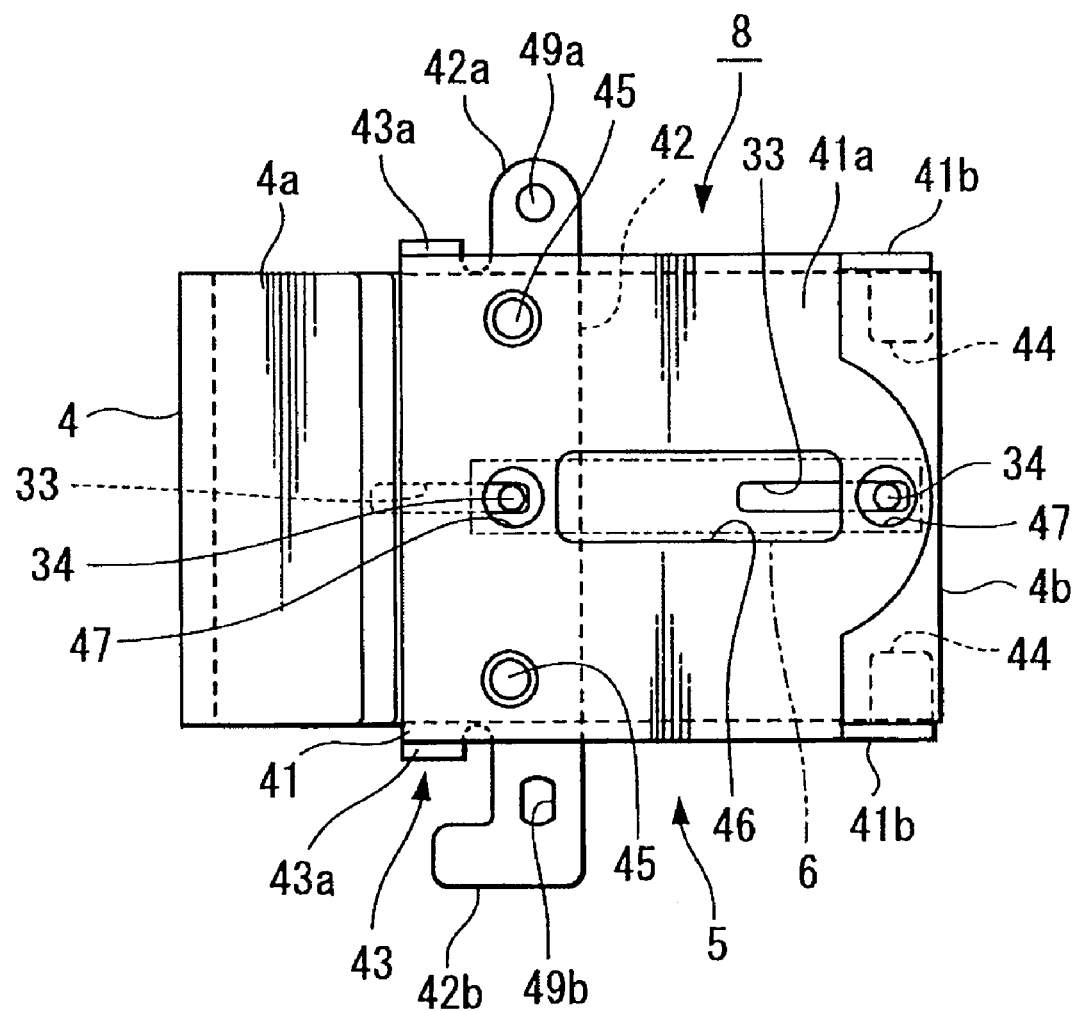
FIG. 9 is a plan view showing a first example of a support member fixing mechanism in accordance with a cradle device according to an embodiment of the invention.
Figure 10:
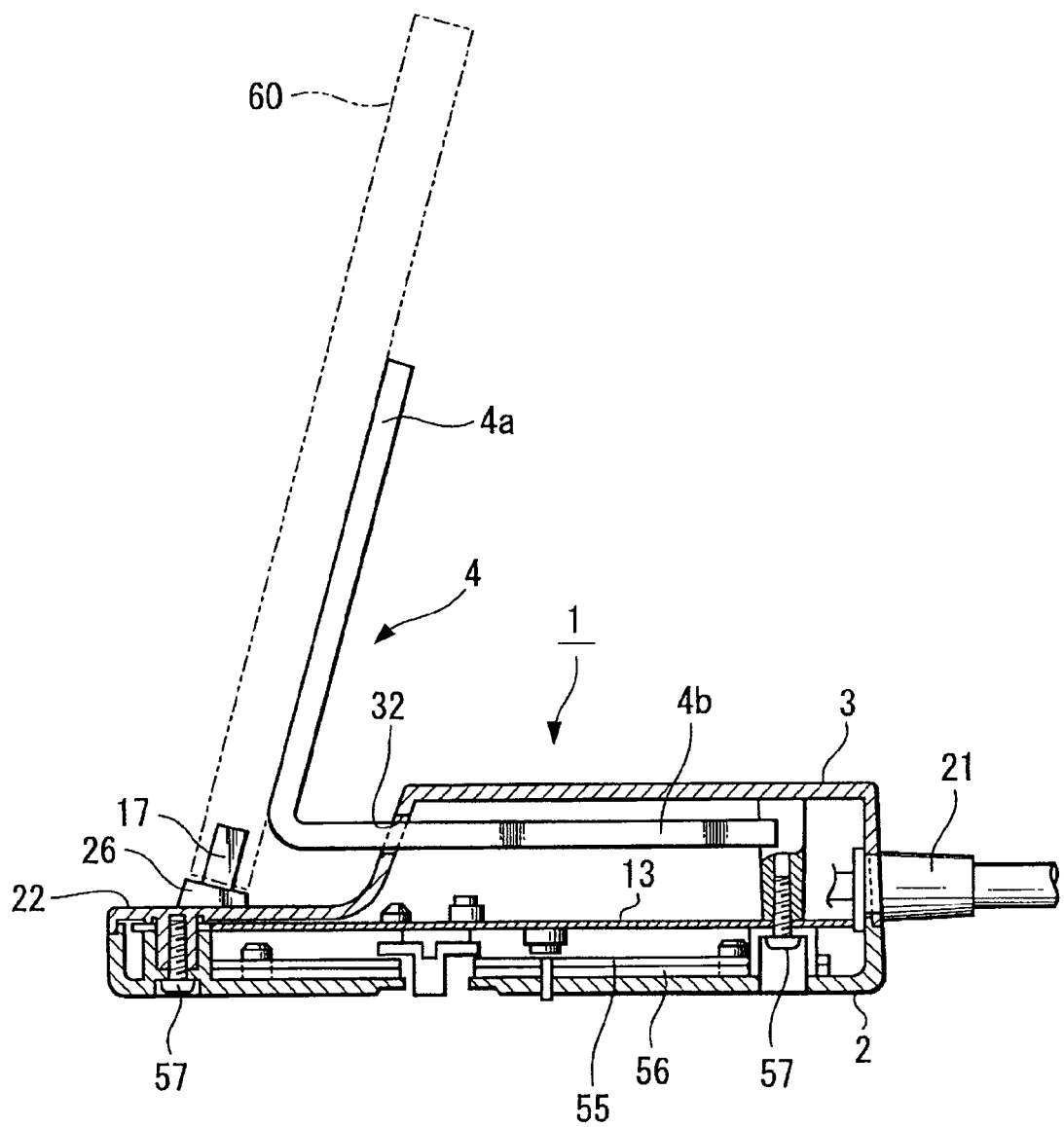
FIG. 10 is a longitudinal cross-sectional right side view describing a first example of a cradle device according to an embodiment of the invention.
Figure 11:
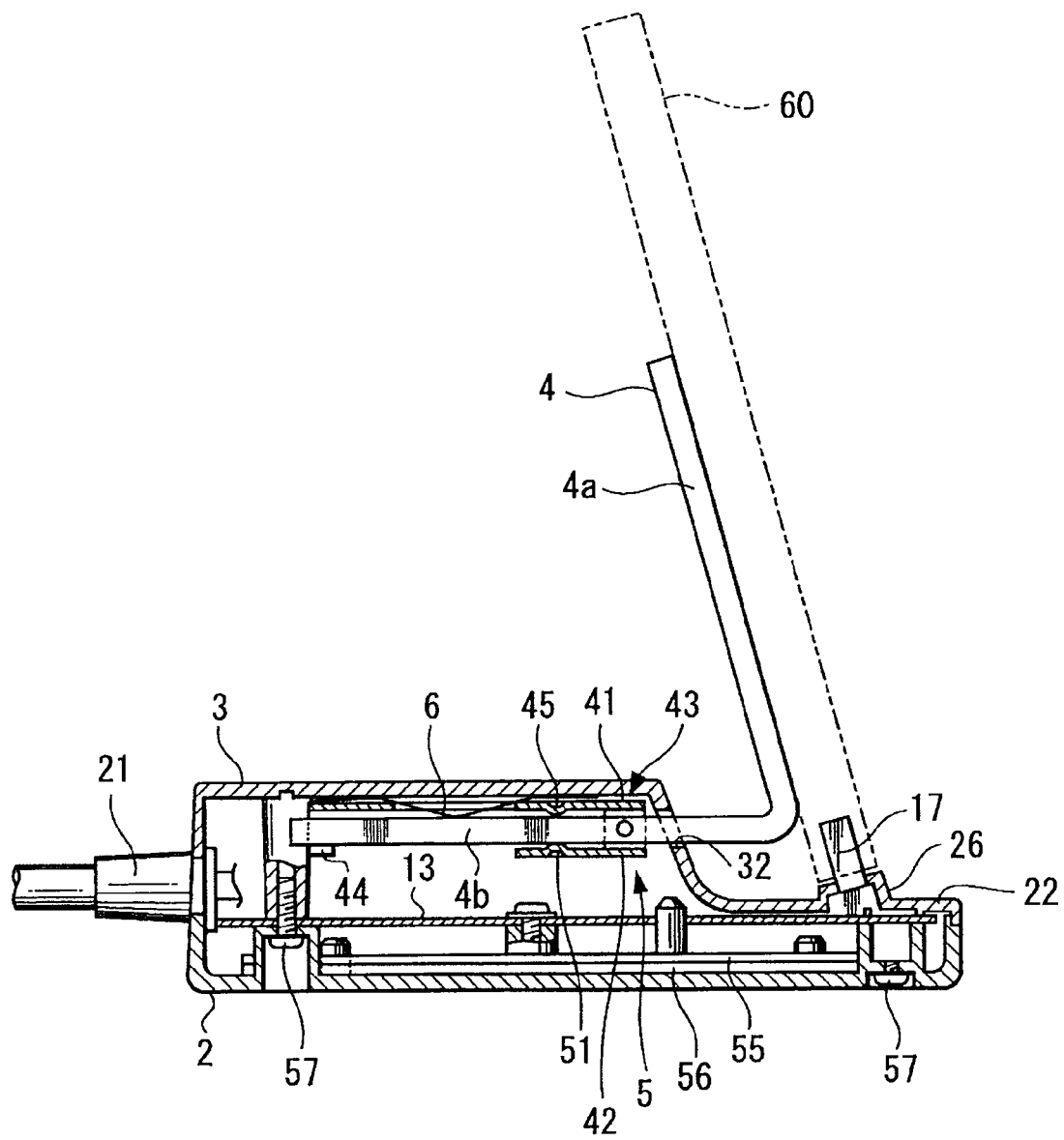
FIG. 11 is a longitudinal cross-sectional left side view describing a first example of a cradle device according to an embodiment of the invention.
Figure 12:
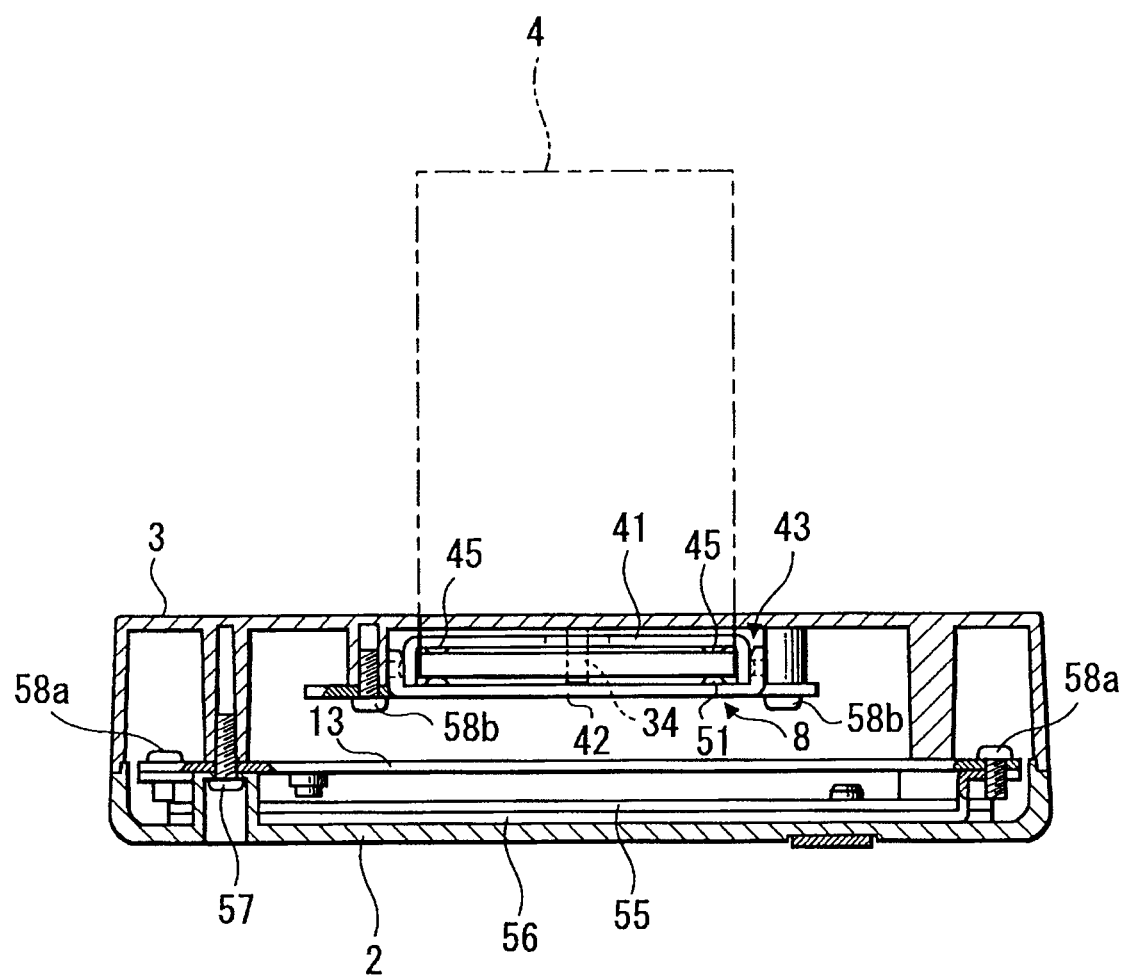
FIG. 12 is a transverse cross-sectional front view describing a first example of a cradle device according to an embodiment of the invention.
Figure 13:
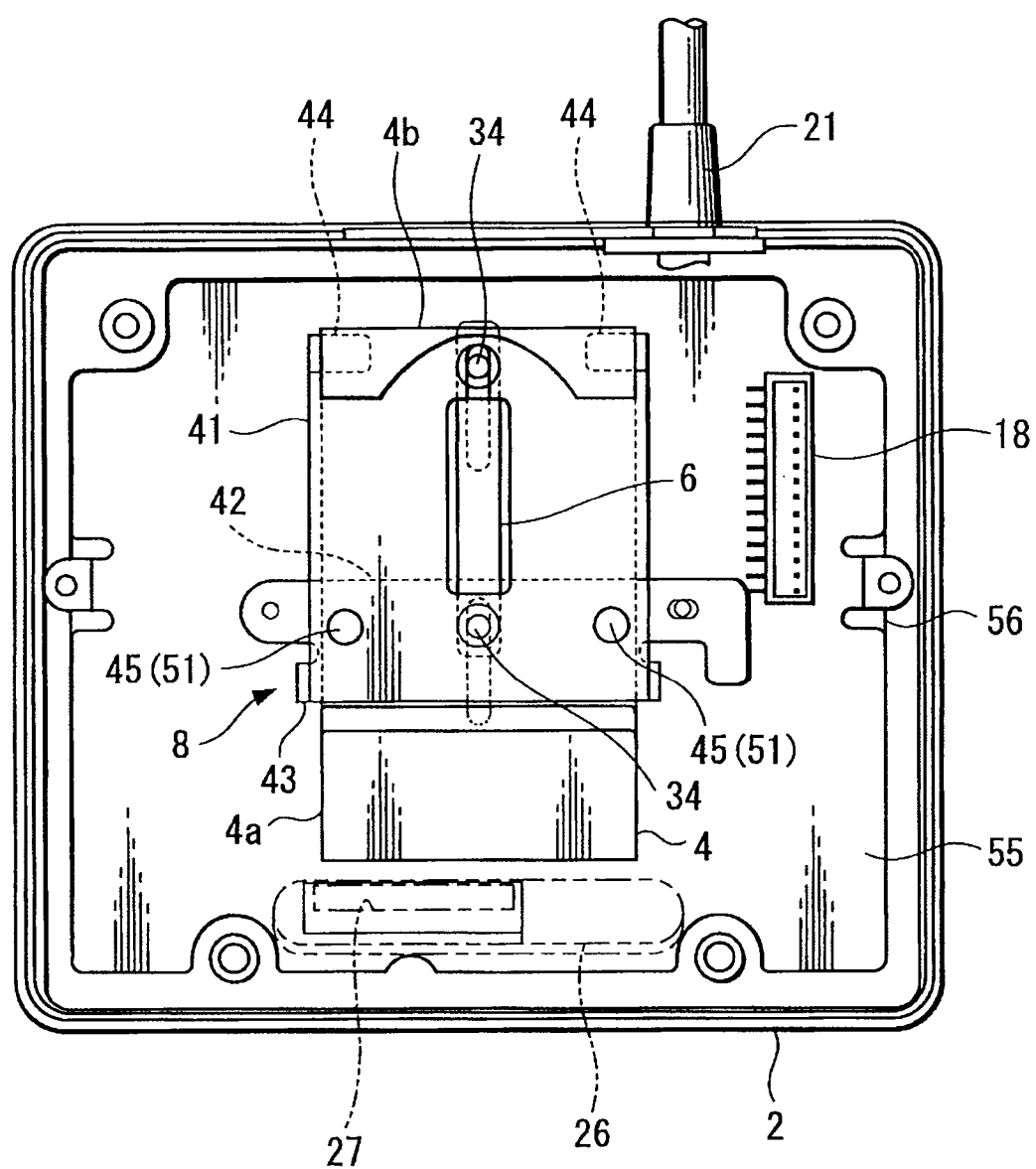
FIG. 13 is a plan view describing a cradle device according to an embodiment of the invention from which an upper case is removed.
Figure 14:
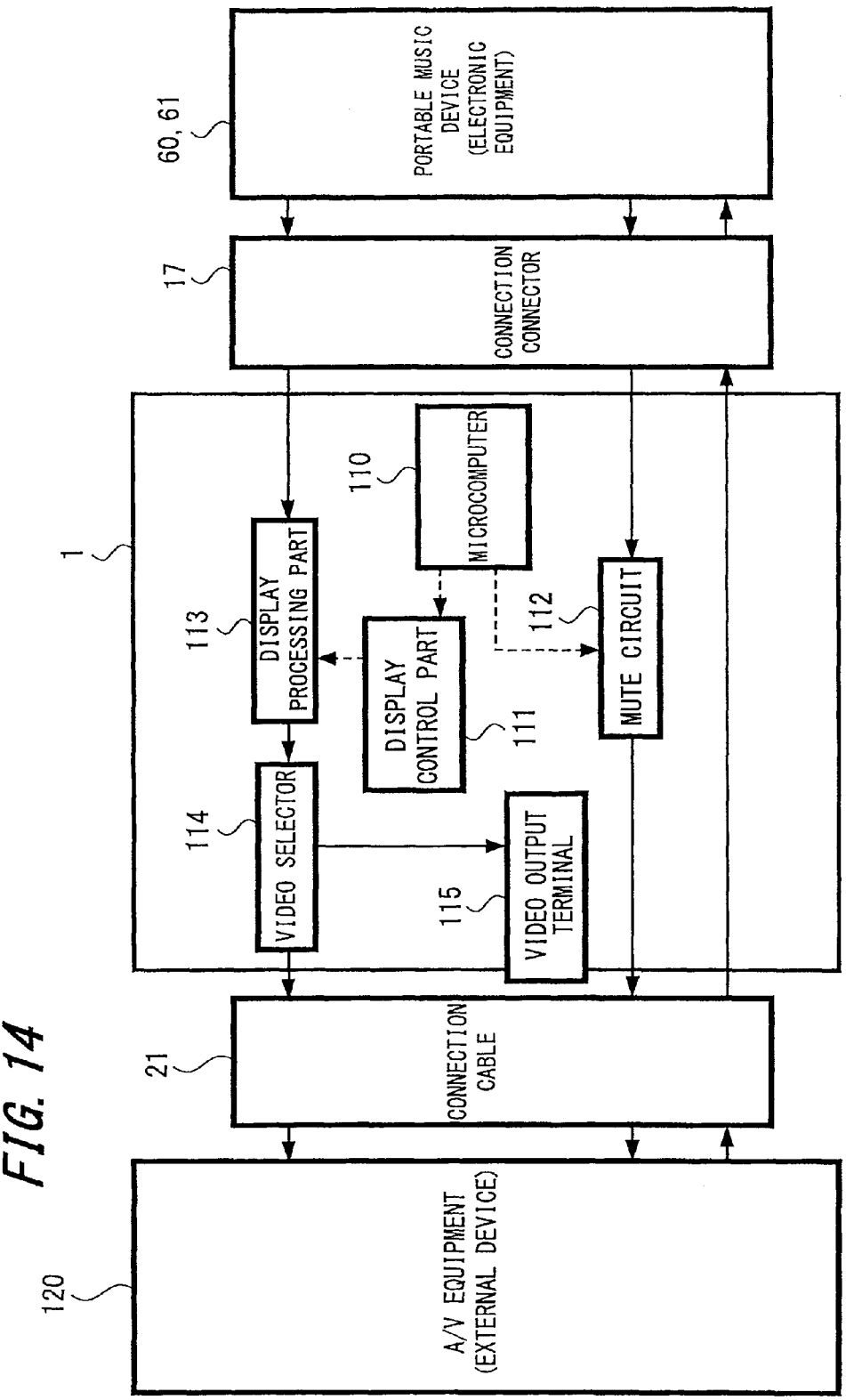
FIG. 14 is a block diagram schematically describing a circuit configuration of a cradle device according to an embodiment of the invention.
Figure 15:
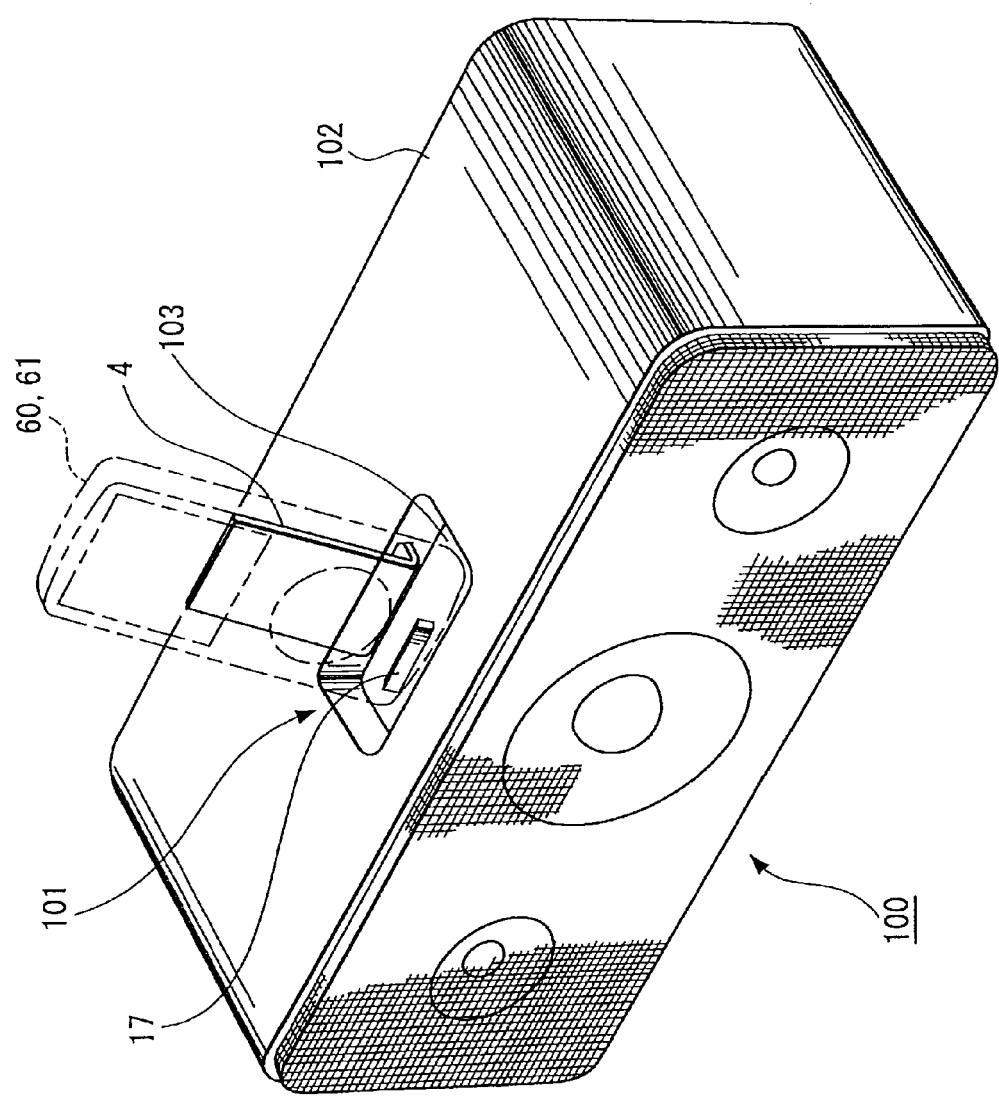
FIG. 15 is a perspective view showing a first example of electronic equipment including a cradle device according to an embodiment of the invention.

Embodiments of the invention will be described below with reference to the attached drawings. FIGS. 1 to 22 describe examples of embodiments of the invention. FIG. 1 is an exploded view describing a first example of a cradle device according to an embodiment of the invention. FIG. 2 is an assembly perspective view, FIG. 3A is a front view, FIG. 3B is a rear view, FIG. 4A is a right side view, and FIG. 4B is a plan view, each showing a whole configuration of the cradle device. FIG. 5 is a view describing a state where thin electronic equipment is mounted on the cradle device. FIG. 6 is a view describing a state where thick electronic equipment is mounted on the cradle device. FIG. 7 is a perspective view of an upper case, a holding member, and a plate spring. FIG. 8A is a side view, FIG. 8B is a front view, and FIG. 9 is a plan view, each showing a first example of a support member fixing mechanism. FIG. 10 is a longitudinal cross-sectional right side view, FIG. 11 is a longitudinal cross-sectional left side view, and FIG. 12 is a transverse cross-sectional front view, each describing the cradle device. FIG. 13 is a plan view of the cradle device from which an upper case is removed. FIG. 14 is a block diagram schematically showing a circuit configuration of the cradle device. FIG. 15 is a view describing an example in which a cradle device according to an embodiment of the invention is formed integrally with electronic equipment.

Figure 16:
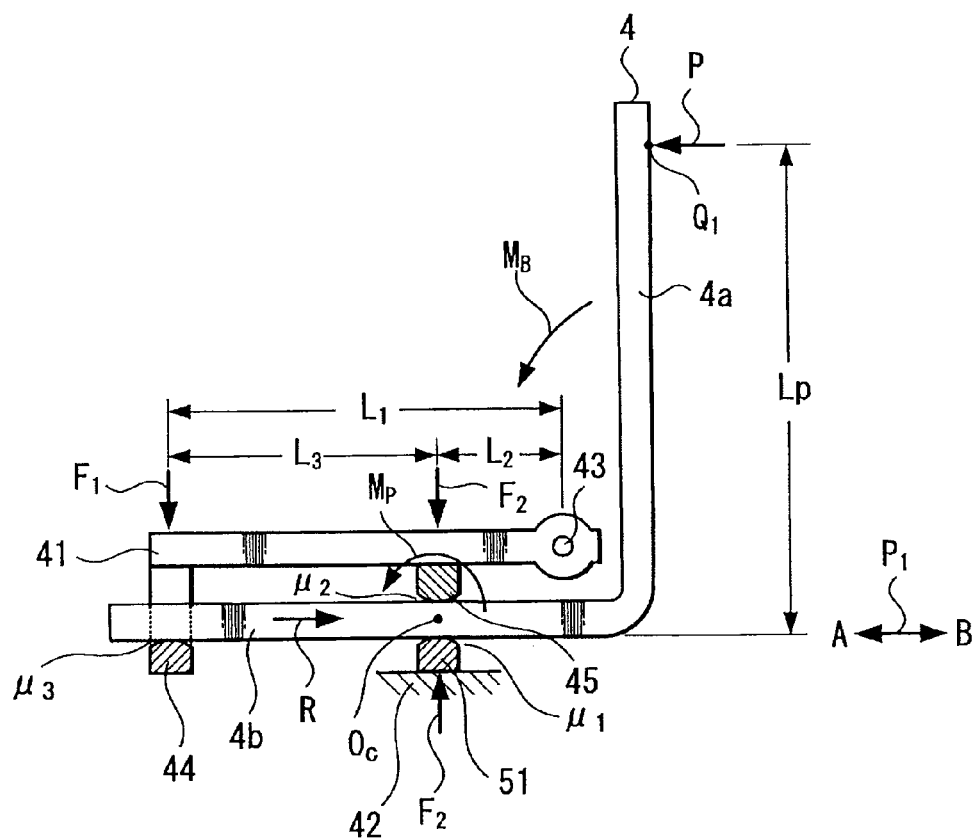
FIG. 16 is a view describing a force relation in a first example of a support member fixing mechanism in accordance with a cradle device according to an embodiment of the invention.
Figure 17A:
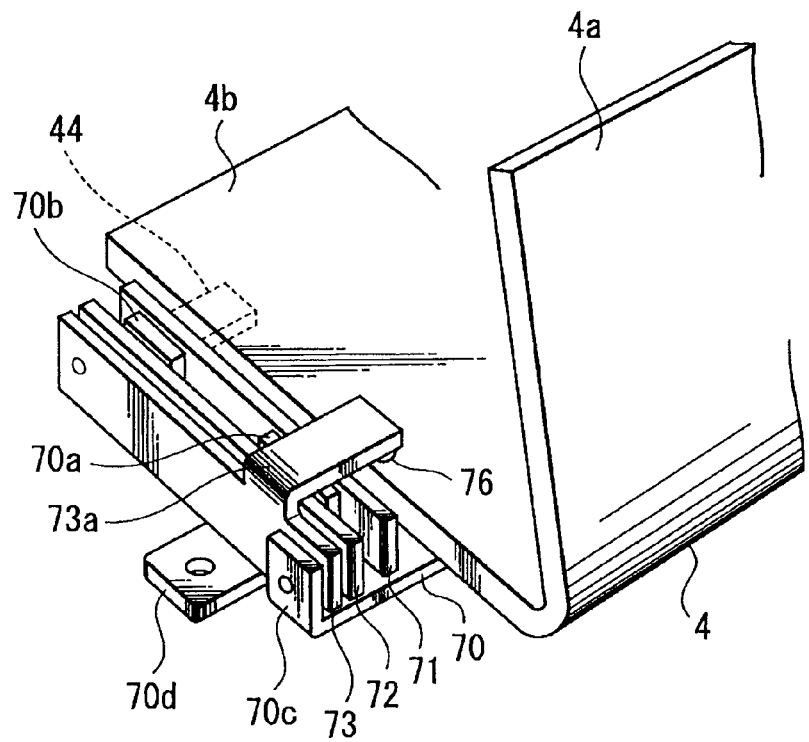
FIG. 17A is a perspective view and FIG. 17B is a front view.
Figure 17B:
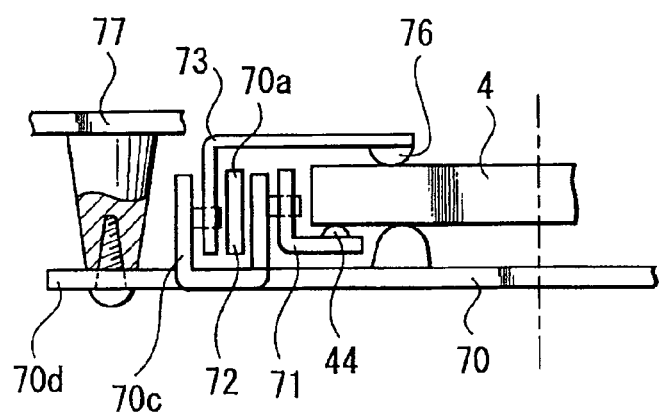
Figure 18:
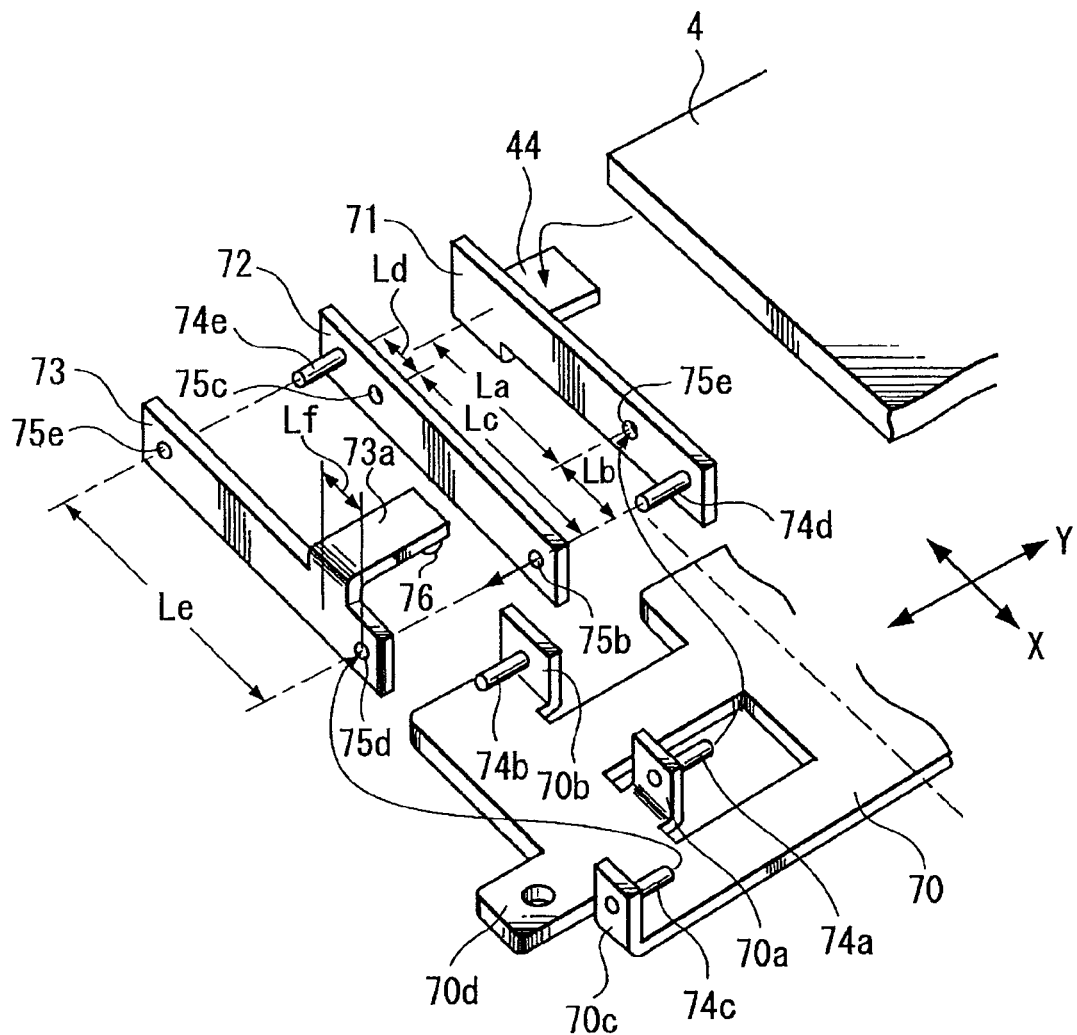
FIG. 18 is an exploded perspective view showing a second example of a support member fixing mechanism in accordance with a cradle device according to an embodiment of the invention.
Figure 19:
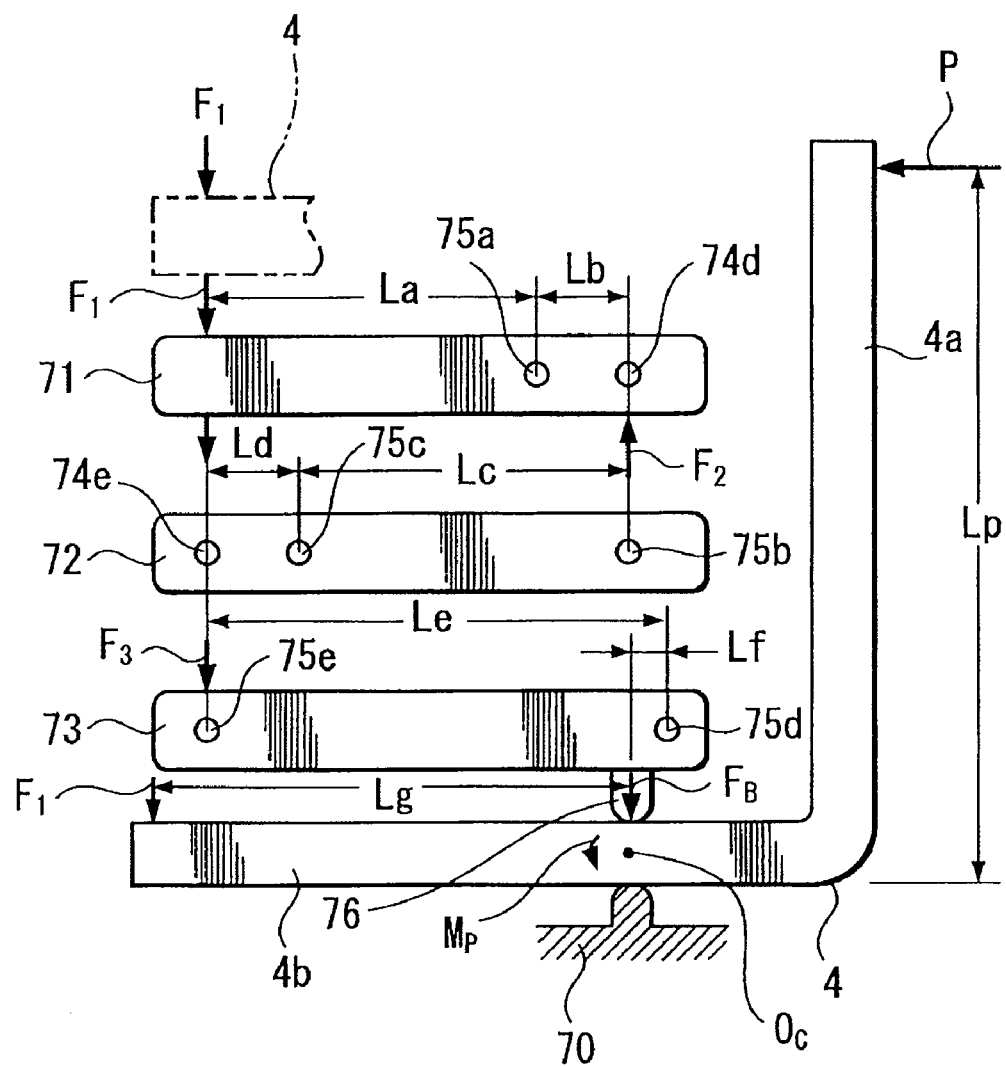
FIG. 19 is a view describing a force relation in a second example of a support member fixing mechanism in accordance with a cradle device according to an embodiment of the invention.
Figure 20:
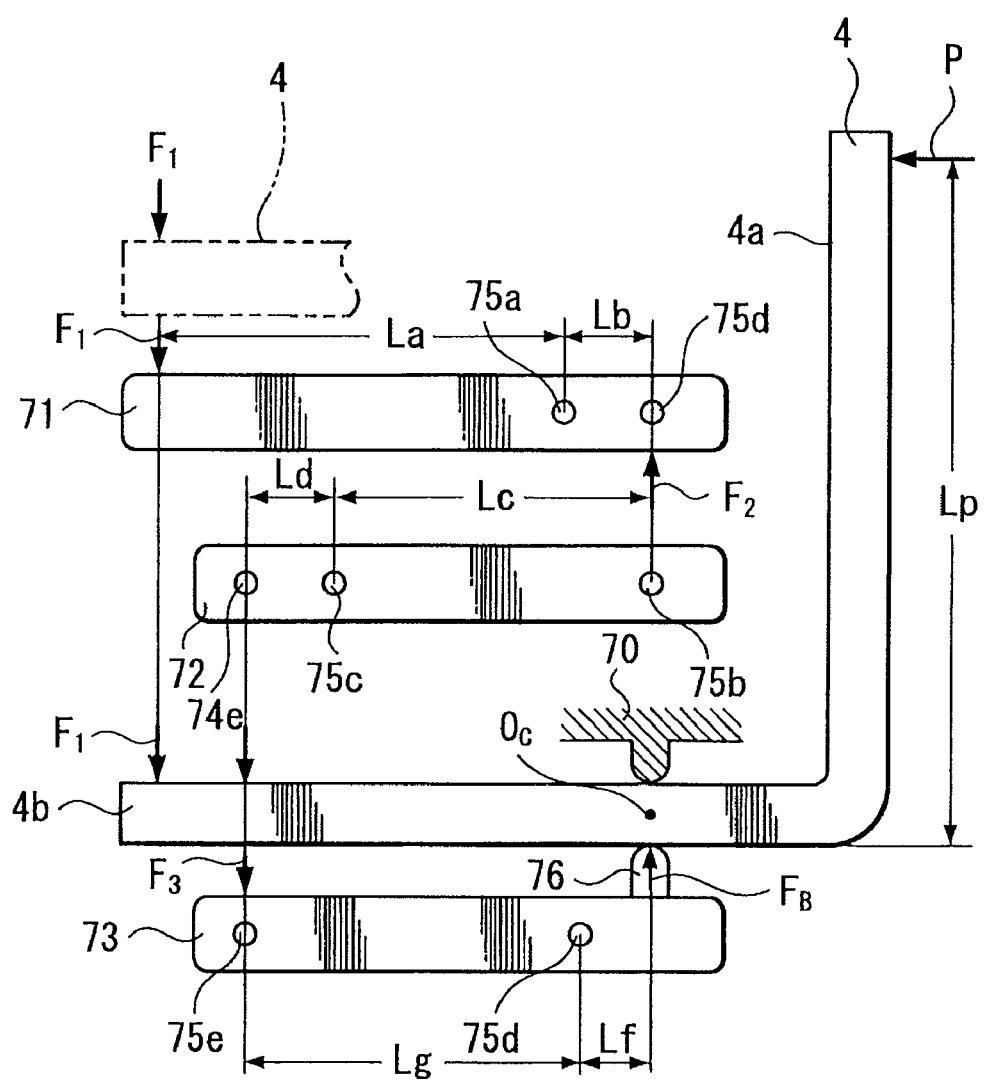
FIG. 20 is a view describing a force relation in a third example of a support member fixing mechanism in accordance with a cradle device according to an embodiment of the invention.
Figure 21:
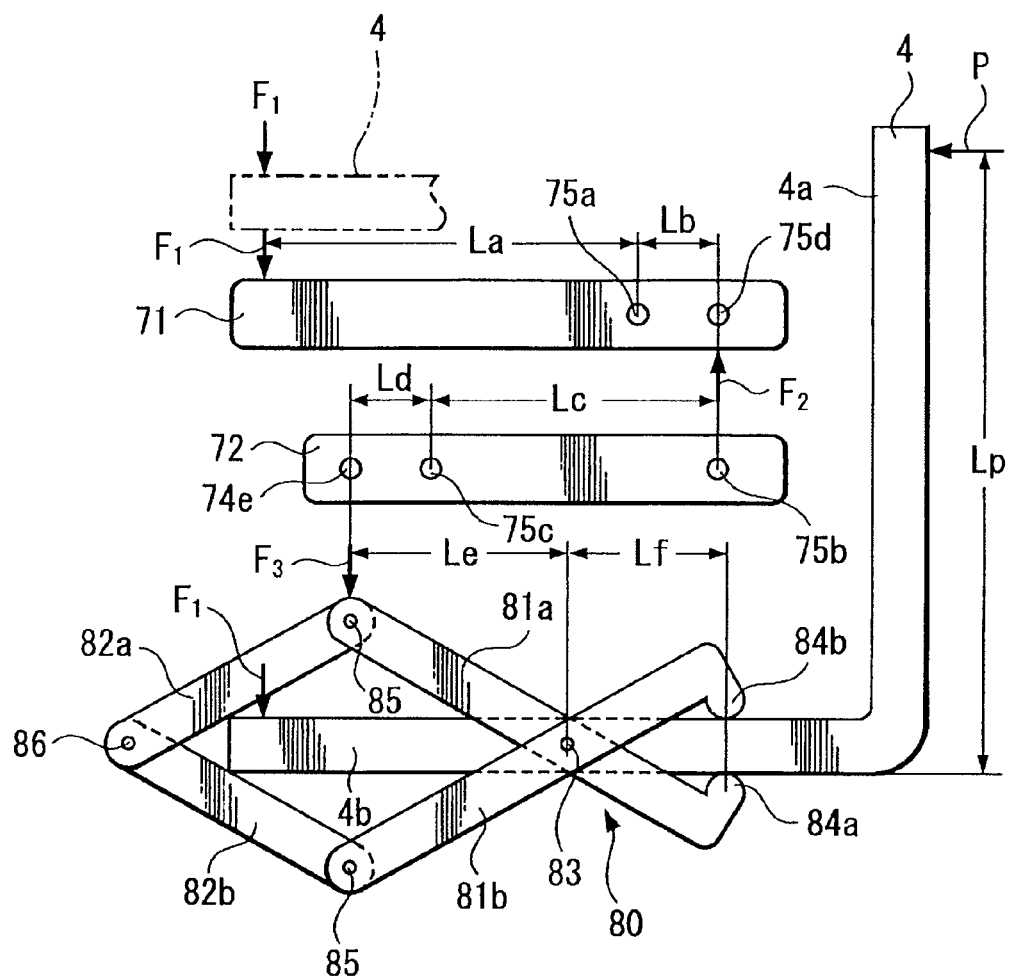
FIG. 21 is a view describing a force relation in a fourth example of a support member fixing mechanism in accordance with a cradle device according to an embodiment of the invention.

FIG. 16 is a view describing a force relation in a first example of a support member fixing mechanism in accordance with a cradle device according to an embodiment of the invention. FIG. 17A is a perspective view and FIG. 17B is a front view, each showing a second example of the support member fixing mechanism. FIG. 18 is an exploded perspective view showing the second example. FIG. 19 is a view describing a force relation in the second example. FIG. 20 is a view describing a force relation in a third example of the support member fixing mechanism. FIG. 21 is a view describing a force relation in a fourth example of the support member fixing mechanism. FIG. 22 is a view describing a force relation in a fifth example of the support member fixing mechanism.

(1) Configuration and Action of Cradle Device

First, a cradle device 1 will be described. As shown in FIGS. 1 to 4, the cradle device 1 includes a lower case 2, an upper case 3, a support member 4, a holding member 5, a plate spring 6, and a wiring board 13. The lower case 2 is formed by an enclosure having a quadrangular plane and having an opening on an upper surface. Specifically, the lower case 2 has a rectangular lower surface part 2a; a front surface part 2b continuous with and rising upward from a front edge of the lower surface part 2a; a rear surface part 2c continuous with and rising upward from a rear edge of the lower surface part 2a; and left and right side surface parts 2d and 2e continuous with and rising upward from left and right edges of the lower surface part 2a, respectively, and the four surface parts 2b to 2e are continuously formed to have an equal height. A recess 11 is formed by the four surface parts 2b to 2e, and an edging 12 is provided in order to be fitted with the upper case 3 on peripheries of the four surface parts 2b to 2e surrounding the recess 11.

As shown in FIG. 1, a wiring board 13 is stored in the recess 11 of the lower case 2, and the wiring board 13 is screwed to the lower case 2 by a plurality of fixing screws. The wiring board 13 has a control circuit 14 controlling driving of the cradle device 1. The control circuit 14 has a semiconductor device 15 such as a microcomputer, RAM, or ROM and an electronic component 16 such as a capacitor. The semiconductor device 15 and the electronic component 16 are mounted on the wiring board 13 and electrically connected to a wiring circuit provided on the wiring board 13 at predetermined positions.

Further, a first connector 17 detachably connected to electronic equipment; a second connector 18 connected to an external device; and an output jack 19 to which an external device is detachably connected are attached to an upper surface of the wiring board 13. The first connector 17 is placed approximately centrally on a front side of the wiring board 13 and its connection part protrudes upward with a tip slightly inclined backward. Electronic equipment such as a portable music device, portable telephone, or PHS is electrically, mechanically, and detachably connected to the first connector 17. The first connector 17 is inclined backward, so that electronic equipment is supported as inclined at an inclination angle of the first connector 17.

The second connector 18 is placed on one rear side of the wiring board 13. The second connector 18 is formed to be stored in the upper and lower cases 2 and 3, and one edge of a connection cable 21 is electrically and mechanically connected to the second connector 18. The connection cable 21 is exposed to outside through a notch of a rising part 2f provided in the rear surface part 2c of the lower case 2 and is electrically connected to an external device such as an A/V (audio/visual) device or MD/CD player. The jack 19 is placed opposite to the second connector 18 on a rear side of the wiring board 13. The jack 19 has a tip exposed from the notch provided in the rising part 2f. An earphone or the like is detachably connected to the jack 19.

The upper case 3 has a shape and size corresponding to those of the lower case 3 and has a rectangular plane. The upper case 3 has a step in a middle in a longitudinal direction to have an upper surface part 3a behind the step and a flat surface part 22 in front of the step and one step lower than the upper surface part 3a. A front surface part 3b is formed between the upper surface part 3a and the flat surface part 22, and the front surface part 3b is provided as a plane inclined at an angle equal to an inclination angle of electronic equipment detachably mounted. A rear surface part 3c is provided continuously with and falling downward from a rear edge of the upper surface part 3a of the upper case 3. Left and right side surface parts 3d and 3e are provided continuously with and falling downward from left and right edges of the upper surface part 3a, respectively.

Outer peripheries of the three surface parts 3c to 3e excluding the front surface part 3b up to the flat surface part 22 in the upper case 3 are continuously formed with an equal height. A recess 23 is formed by the four surface parts 3b to 3e including the front surface part 3b, and an edging 24 is provided in order to be fitted with the edging 12 of the lower case 2 on peripheries of the four surface parts 3b to 3e surrounding the recess 23. Further, a notch 25 is provided on the rear surface part 3c to avoid interference with the rising part 2f of the lower case 2. Part of the support member 4 is inserted into a space formed by the recess 23 of the upper case 3 and the recess 11 of the lower case 2, and the holding member 5 and the wiring board 13 are stored in the space.

A seating 26 is provided approximately centrally in the flat surface part 22 of the upper case 3 to support detachably mounted electronic equipment from below. The seating 26 is formed protruding obliquely backward and has an upper end surface deployed in a direction approximately at right angles with a direction in which the seating 26 protrudes. A fitting hole 27 formed by a long hole extending in a transverse direction is opened in the seating 26. The first connector 17 is inserted into the fitting hole 27, where the first connector 17 is mounted on the wiring board 13 joined and fixed to the lower case 2. Here, an upper part of the first connector 17 is inclined at a predetermined angle to the front surface part 3b of the upper case 3. Note that the upper part of the first connector 17 can be inclined at 10 to 30°, for example; however, such an inclination angle in an embodiment of the invention is not limited thereto.

As shown in FIG. 7, two screwing shafts 28, 28 are provided on a lower surface of the flat surface part 22 of the upper case 3 in order to screw the upper case 3 to the lower case 2. The wiring board 13 has two holes 31, 31 corresponding to the screwing shafts 28, the holes into which the screwing shafts 28 are inserted, respectively. Further, two screwing shafts 29, 29 are similarly provided on a lower surface of the upper surface part 3a in order to screw the upper case 3 to the lower case 2.

As shown in FIG. 1, an insertion hole 32 formed by a long hole extending in a transverse direction is provided approximately centrally in the front surface part 3b of the upper case 3. A brake 4b forming part of the supporting member 4 is slidably inserted into the insertion hole 32. The support member 4 is formed by bending a long plate material in an approximately horizontal V-shape. Note that the bending angle of the support member 4 may be approximately 65 to 85°, for example; however, such a bending angle in an embodiment of the invention is not limited thereto. A support 4a is formed in one of bent parts and the brake 4b is formed in the other bent part. Further, the brake 4b has two guide holes 33, 33 formed by long holes to prevent transverse movement of the support member 4 and move the support member 4 linearly only in a longitudinal direction. The two guide holes 33, 33 are provided approximately centrally in the brake 4b with a predetermined interval in a longitudinal direction between them.

Two guide pins 34, 34 provided on the lower surface of the flat surface part 22 of the upper case 3 are slidably engaged with the two guide holes 33, 33 of the support member 4. The brake 4b is slidably retained by the holding member 5 with the two guide pins 34, 34 engaged with the two guide holes 33, 33. The holding member 5 is screwed by two screwing shafts 35, 35 provided on the lower surface of the flat surface part 22 and fixed to the upper case 3.

As a material for the lower case 2, the upper case 3, and the support member 4, ABS (acrylonitrile-butadiene-styrene resin) is preferable, for example, but another engineering plastic may obviously be used. Further, a metal such as an aluminum alloy or magnesium alloy may be used, for example, in addition to engineering plastic.

As shown in FIGS. 1 and 7, the holding member 5 is formed by a first holder 41 and a second holder 42 rotatably connected to each other by a hinge 43. The first holder 41 retains the brake 4b of the support member 4 and is formed of a thin plate material. The first holder 41 has an approximately rectangular flat surface part 41a deployed approximately parallel to the brake 4b; and two side surface parts 41b, 41b provided on both sides of the flat surface part 41a in a direction Y (may be abbreviated as "crossing direction") perpendicular to a direction X (may be abbreviated as "an operation direction") in which the brake 4b reciprocates. The two side surface parts 41b, 41b are formed by bending two opposite sides of the flat surface part 41a at a predetermined width at 90°.

The hinge 43 is provided on edges on one side in a longitudinal direction of the two side surface parts 41b, 41b. Action parts 44 are respectively provided on edges on the other side in the longitudinal direction of the two side surface parts 41b, 41b to support the brake 4b when an external force is applied to the support 4a. The two action parts 44, 44 are each formed as a nail-like projection and extend approximately parallel to the flat surface part 41a. Further, two first holding projections 45, 45 are provided near the hinge 43 of the flat surface part 41a to be brought into pressure contact with a surface of the brake 4b opposite to a surface in contact with the action parts 44. The two first holding projections 45, 45 are placed at positions approximately symmetrical in the operation direction X and formed protruding toward an action part 44 side of an inner surface of the flat surface 41a.

Further, an opening 46 is provided approximately centrally in the crossing direction Y in the flat surface part 41a to allow a spring part 6a of the plate spring 6 to pass therethrough. Two escape holes 47, 47 are provided on both sides in the operation direction X of the opening 46 of the flat surface part 41a to allow the two guide pins 34 provided in the upper case 3 to pass therethrough. The plate spring 6 is supported by the two guide pins 34, 34.

The plate spring 6 is formed of a long thin plate-like spring material and has the spring part 6a in a middle in a longitudinal direction, a fixing part 6b on one edge in the longitudinal direction, and a sliding part 6c on the other edge in the longitudinal direction. The spring part 6a of the plate spring 6 is formed as V-shaped or U-shaped, and smoothly slides to and is brought into contact with the brake 4b. A round hole 48a is provided in the fixing part 6b of the plate spring 6, and a long hole 48b extending in a longitudinal direction is provided in the sliding part 6c. The two guide pins 34, 34 are individually inserted into the round hole 48a and the long hole 48b, and the plate spring 6 is positioned by the round hole 48a. The long hole 48b allows elastic deformation of the spring part 6a.

The second holder 42 holds the brake 4b in cooperation with the first holder 41 and also fixes the holding member 5 to the upper case 3. The second holder 42 is formed of a thin plate material on one side in a transverse direction to have hinge pieces 43a on both sides in a longitudinal direction. The two hinge pieces 43a, 43a are bent at 90° in an identical direction, and a bearing hole is provided in each hinge piece 43a. The first holder 41 is present between the hinge pieces 43a, 43a. Outward projections provided in the two side surface parts 41b, 41b of the first holder 41 are rotatably engaged with the bearing holes, respectively, to form the hinge 43.

The second holder 42 is connected to the first holder 41 with its longitudinal direction in the crossing direction Y. Both edges in the longitudinal direction of the second holder 42 protrude outward from both edges in the crossing direction Y of the first holder 41, respectively. One protrusion 42a of the second holder 42 has an insertion hole 49a also functioning to determine a position into which a fixing screw shaft is inserted, and the other protrusion 42b has an insertion hole 49b also functioning to adjust the position into which the fixing screw shaft is inserted.

Further, two second holding projections 51, 51 identical in shape and size to the two first holding projections 45, 45 provided in the first holder 41 are provided protruding toward an opposite side at positions in the second holder 42 corresponding to the first holding projections 45, 45. The two second holding projections 51, 51 are placed at positions overlapping the two first holding projections 45, 45, respectively. These four holding projections 45, 51 may hold the brake 4b in two places in total. This holding state occurs when an external force is applied to a certain region of the support 4a. Here, a tip of the brake 4b is supported by the two action parts 44, 44. In this supporting state, the support member 4 is locked by the holding member 5, and the support member 4 is prevented from being moved in the operation direction X at that position.

FIGS. 8A, 8B, and 9 are a right side view, a front view, and a plan view, each showing a state where a first example of a support member fixing mechanism is formed by joining the support member 4 to the holding member 5. As shown in FIGS. 8 to 9, in the support member fixing mechanism 8, the brake 4b of the support member 4 is inserted into a space surrounded by the first holder 41 and the second holder 42 of the holding member 5. The plate spring 6 is present between the flat surface part 41a of the first holder 41 and the brake 4b, and the brake 4b is energized toward the second holder 42 by its spring force. Accordingly, the brake 4b is pressed by the two second holding projections 51, 51 of the second holder 42 and the two action parts 44, 44 of the first holder 41, and supported by these four points and the spring part 6a of the plate spring 6.

Here, the two first holding projections 45, 45 of the first holder 41 are slightly distant from or may be simply brought into contact with the brake 4b. Therefore, when an external force is horizontally or obliquely applied to a side close to the brake 4b of the support 4a to make a bending moment acting on the support member 4 a predetermined value or smaller, a resistance force acting to prevent movement of the support member 4 is only a frictional force generated in the two second holding projections 51, 51 and the two action parts 44, 44 by a spring force of the plate spring 6 and a small bending moment having a predetermined value or smaller. For this reason, the support member 4 may be extremely easily moved.

On the other hand, when an external force is horizontally or obliquely applied to a tip of the support 4b that is distant from the brake 4b, a large bending moment is generated in the support member 4, with a point on which the external force acts as a power point, a part held by the two first holding projections 45, 45 and the two second holding projections 51, 51 as a fulcrum, and the two action parts 44, 44 as a point of action. As a result, a large holding force to hold the brake 4b between the two first holding projections 45, 45 and the two holding projections 51, 51 is generated in proportion to a level of generated bending moment. The support member 4 is prevented from being moved in the operation direction X by this fastening force, so that the support member 4 may be firmly fixed at that position.

FIGS. 10 to 13 show a state in which the support member fixing mechanism 8 is incorporated in an enclosure formed by the lower case 2 and the upper case 3, where FIG. 10 is a longitudinal cross-sectional right side view, FIG. 11 is a longitudinal cross-sectional left side view, FIG. 12 is a transverse cross-sectional front view, and FIG. 13 is a plan view in which the upper case 3 is removed.

The support member fixing mechanism 8 is stored in the upper case 3 and screwed to an inner surface of the upper surface part 3a by a plurality of fixing screws 54. Here, a space in the holding member 5 is opposed to the insertion hole 32 of the upper case 3, and the brake 4b of the support member 4 is inserted into the insertion hole 32. The support 4a of the support member 4 protrudes toward outside the upper case 3 and is opposed to the first connector 17 for electronic equipment connection. Two base plates 55, 56 also functioning as a weight are stored in and screwed to the recess 11 of the lower case 2. The two base plates 55, 56 are almost identical in shape to the wiring board 13 and overlap each other. The wiring board 13 is screwed to the upper base plate 55 with a predetermined clearance between them. The upper case 3 is superposed on the lower case 2 assembled in this manner, and assembly and disassembly may be performed using a plurality of fixing screws 57 as shown in FIG. 10.

Next, an assembly process of the cradle device 1 having the aforementioned configuration will be described. The cradle device 1 may be simply assembled by the following process, for example. First, the base plates 55, 56 are overlappingly stored in the recess 11 of the lower case 2 and fixed by fixing screws. Next, the wiring board 13 is screwed to the upper base plate 55 by fixing screws 58a. Accordingly, the first connector 17 and the jack 19 mounted on the wiring board 13 are positioned at predetermined positions. The support member 4 and the holding member 5 are attached to the upper case 3 at the same time or before or after the positioning.

In assembly of the upper case 3, the plate spring 6 is placed on an inner surface of the upper surface part 3a of the upper case 3. This is performed by inserting the round hole 48a provided on one side in a longitudinal direction of the plate spring 6 into the front guide pin 34 placed closer to the insertion hole 32 and inserting the long hole 48b provided on the other side in the longitudinal direction into the rear guide pin 34 placed distant from the insertion hole 32. Next, the holding member 5 is placed so that the first holding member 41 overlaps the plate spring 6. Further, the brake 4b is inserted into the insertion hole 32 with the support 4a directed opposite to the flat surface part 22. Thereafter, the brake 4b is inserted between the first holder 41 and the second holder 42 placed inside the insertion hole 32, and then further inserted inward to make a tip of the brake 4b present between the action parts 44 and the flat surface part 41a.

Next, the rear guide pin 34 is inserted into the rear guide hole 33 placed on the tip of the brake 4b, and the front guide pin 34 is inserted into the front guide hole 33 placed on a side of the brake 4b close to the support 4a. Then, as shown in FIG. 12, both sides in a longitudinal direction of the second holder 42 is screwed to the upper case 3 by fixing screws 58b. Accordingly, the support member fixing member 8 is attached to the upper case 3, so that the upper case 3 is completely assembled. Here, the spring part 6a of the plate spring 6 passes through the opening 46 provided in the flat surface part 41a of the first holder 41 and is brought into pressure contact with one surface of the brake 4b. As a result, the brake 4b is pressed by the two action parts 44, 44 of the first holder 41 and the two holding projections 51, 51 of the second holder 42 by a spring force of the plate spring 6.

The upper case assembly assembled in this manner is superposed on the lower case assembly. Then, as shown in FIGS. 10 to 12, the lower case 2 is fastened and fixed to the upper case 2 by the plurality of fixing screws 57. The cradle device 1 is completely assembled in this manner.

FIGS. 2 to 4 show an appearance configuration of an example of a cradle device according to an embodiment of the invention, where FIG. 2 is a front perspective view, FIG. 3A is a front view, FIG. 3B is a rear view, FIG. 4A is a right side view, and FIG. 4B is a plan view. Electronic equipment as shown in FIGS. 5 and 6, for example, is attached to the cradle device 1 having such an appearance configuration and used.

FIG. 5 shows a first specific example of electronic equipment suitable in an embodiment of the invention, which is a portable music player 60 as one example of a portable music device. The portable music player 60 is mounted on the seating 26 also functioning as a charging part of the cradle device and is electrically and mechanically connected to the first connector 17. The portable music player 60 has an exterior case 201 formed by a hollow enclosure relatively thinly formed and approximately rectangular parallelepiped. There are placed, on a front surface of the exterior case 201, a display 202 displaying icons, windows, or the like on a screen and a disc-shaped operation key 203 for selecting an icon, a window, or the like displayed in the display 202. A terminal connector to connect the portable music player 60 to the cradle device 1 or the like electrically and mechanically (not shown) is provided on a bottom surface of the exterior case 201. The terminal connector is a female connector to which the first connector 17 of the cradle device 1 may be connected.

FIG. 6 shows a second specific example of electronic equipment suitable in an embodiment of the invention, which is a portable telephone 61 having a music reproduction function. The portable telephone 61 is mounted on the seating 26 also functioning as a charging part of the cradle device and is electrically and mechanically connected to the first connector 17. The portable telephone 61 has an exterior case 211 formed by a hollow enclosure relatively thickly formed and approximately rectangular parallelepiped. There are placed, on a front surface of the exterior case 211, a display 212 displaying icons, windows, input information, or the like on a screen and a ten key 213 for selecting an icon, a window, or the like displayed in the display 212 and inputting desired information. A terminal connector to connect the portable telephone 61 to the cradle device 1 or the like electrically and mechanically (not shown) is provided on a bottom surface of the exterior case 211. The terminal connector is also a female connector to which the first connector 17 of the cradle device 1 may be connected.

When the portable telephone 61 or the portable music player 60 is mounted on the cradle device 1, its terminal connector is fitted with the first connector 17 protruding from the seating 26. Then, the electronic equipment is inserted to a predetermined depth to connect the portable music player 60 or the like to the cradle device 1 electrically and mechanically. Here, it is preferable to previously move the support member 4 slightly backward in terms of operability, because a wide operation space may be ensured. However, it is obviously possible to place the support member 4 at a predetermined position and mount the portable music player 60 or the like onto the first connector 17 in that state.

Accordingly, the portable music player 60 or the like is inclined at a predetermined angle and mounted on the cradle device 1. Therefore, it is possible to listen to music or watch a broadcast by pressing the operation key 203 or the ten key 213 of the portable music player 60 or the like mounted in the cradle device 1 in that state. Here, the pressing operation may be easily performed, since an operation surface of the portable music player 60 or the like retained on the cradle device 1 is inclined backward at a suitable angle. Furthermore, the support member 4 may be easily moved, because the support member fixing mechanism 8 locks the support member 4 by acting to hold the brake 4a only when a pressure is acted near the operation surface, and a fastening force is not generated or the fastening force is extremely small when pressing a part distant from the operation surface and near the brake 4a.

Next, a relation between forces applied to members such as the support member 4 and the holding member 5 will be physically described.

FIG. 16 is a view describing a principle of physical operation in accordance with the first example of the support member fixing mechanism 8 having the aforementioned configuration. Here, for convenience of description, the support 4a crosses at right angles with the brake 4b in the support member 4. The support 4a has a length $L_P$, and the holding member 5 has a length $L_1$ in a plane direction from the hinge 43 and the action part 44, a length $L_2$ in the plane direction from the hinge 43 to the first holding projection 45, and a length $L_3$ in the plane direction from the first holding projection 45 to the action part 44.

Here, in a free state in which an external force P is not acted, the brake 4b is brought into contact with the two second holding projections 51 of the second holder 42, the two first holding projections 45 of the first holder 41, and the two action parts 44 of the first holder 41, respectively. Here, a coefficient of friction generated between the brake 4b and the second holding projections 51 is $\mu_1$, a coefficient of friction generated between the brake 4b and the first holding projections 45 is $\mu_2$, and a coefficient of friction generated between the brake 4b and the action parts 44 is $\mu_3$.

Here, when an external force $P_1$ is acted approximately on an extension in a plane A or B direction of the brake 4b of the support member 4, the support member 4 slides on the two second holding projections 51 and the two action parts 44. Here, a sliding resistance R generated in the two second holding projections 51 and the two action parts 44 is a value obtained by multiplying a self-weight of the support member 4 by the coefficients of friction of between these parts $\mu_1$ and $\mu_2$ and is therefore extremely small. Therefore, the support member 4 may be moved extremely lightly.

Next, when an external force P in the A direction (or B direction) is acted on a point $Q_1$ on a free end distant from the brake 4b in the support 4a of the support member 4, a rotation moment $M_P$ in a counter-clockwise direction (or clockwise direction) is generated with a part of the brake 4b held by the first holding projections 45 and the second holding projections 51 as a rotation center. When the support member 4 is rotated at a small angle by the rotation moment $M_P$, the action parts 44 are pressed by a free end of the brake 4b and the first holder 41 is rotated in the counter-clockwise direction at a small angle around a rotation center (fulcrum) $O_C$. Then, the first holding projections 45 of the first holder 41 are brought into contact with an upper surface of the brake 4b.

Here, since a lower surface of the brake 4b is already brought into contact with the second holding projections 51 of the second holder 42, the brake 4b may not be moved downward and the first holding projections 45 and the second holding projections 51 are adhered to hold the brake 4b. Further, when the external force P is applied at that position, the first holding projections 45 of the first holder 41 and the second holding projections 51 of the second holder 42 are pressure bonded to strongly press the brake 4b. Here, the support member 4 is a lever with a middle between the first holding projections 45 and the second holding projections 51 as a rotation center $O_P$, that is, a fulcrum. As a result, the following force $F_1$ is applied to the action parts 44 of the first holder 41.

The rotation moment $M_P$ by the force P satisfies the following formula.

$$M_P = P \cdot L_P$$

Therefore, the force $F_1$ applied to the action parts 44 satisfies the following formula.

$$F_1 = M_P/L_3 = P \cdot L_P/L_3$$

Accordingly, a rotation moment $M_B$ is generated around the rotation center (fulcrum) $O_P$ in the first holder 41.

$$M_B = F_1 \cdot L_1 = P(L_P/L_3) \cdot L_1$$

Then, a force $F_2$ is applied to the first holding projections 45 of the first holder 41 as follows.

$$F_2 = M_B/L_2 = P(L_P/L_3) \cdot (L_1/L_2)$$

Specifically, when the external force P is applied to the support 4a, a force $F_2$ $(L_P/L_3)$ $(L_1/L_2)$ times as large as the force P is applied to the first holding projections 45 of the first holder 41 by the lever.

Here, since the second holding projections 51 of the second holder 42 are not moved, the brake 4b of the support member 4 is held by the first holding projections 45 of the first holder 41 and the second holding projections 51 of the second holder 42 with a force of $P(L_P/L_3) \cdot (L_1/L_2)$.

In this case, since the coefficient of friction between the brake 4b and the second holding projections 51 is $\mu_1$ and the coefficient of friction between the brake 4b and the first holding projections 45 is $\mu_2$, the sliding resistance R satisfies the following formula.

$$R = F_2 \mu_1 + F_2 \mu_2 = F_2(\mu_1 + \mu_2)$$

In this case, when $\mu_1 + \mu_2$, the following formula is satisfied.

$$R = 2F_2 \mu_1 = 2P(L_P/L_3) \cdot (L_1/L_2)\mu_1$$

Therefore, when $2(L_P/L_3) \cdot (L_1/L_2)\mu_1$ is 1 or more, $R \geq P$. The support member 4 is locked and stopped at that position.

FIG. 8A is a specific example of the physical operation principle in an embodiment of the invention described with reference to FIG. 16. Components in FIG. 8A and their corresponding components in FIG. 16 are identically numbered, respectively. The plate spring 6 is provided in the upper case 6, and a pressure is applied to the brake 4b by the plate spring 6. By setting such a pressure, a certain sliding resistance is provided and the support member 4 is not easily moved, even when the external force $P_1$ is applied approximately on the extension in the plane direction of the approximately horizontally formed brake 4b of the support member 4. As a result, even when a position of the support member 4 is manually adjusted from outside, the support member 4 is not operated too smoothly and good operation feeling may be provided. Moreover, when adjustment of the position of the support member 4 is stopped, the support member 4 may be retained at that position.

The operation principle of the support member fixing mechanism 8 shown in FIG. 1 and the like is as described above. FIGS. 17 to 22 show application examples of a developed form of a support member fixing mechanism according to an embodiment of the invention. FIGS. 17 to 19 show an operation principle of a second example, FIG. 20 shows an operation principle of a third example, FIG. 21 shows an operation principle of a fourth example, and FIG. 22 shows an operation principle of a fifth example.

In the second example shown in FIGS. 17 to 19, a three-stage link mechanism is formed to increase a force magnification effect by the lever. In this example, the support member 4 may be easily locked even when the coefficients of friction $\mu_1$ and $\mu_2$ by the materials are extremely small. In FIGS. 17 to 19, repeated description of the parts identical to those in the first example is omitted by attaching the same reference symbols. Two sets of the link mechanism shown in the figures are preferably provided to form a symmetrical structure; however, the same effect may be achieved by providing only one set of the link mechanism on one side.

As shown in FIG. 18, three links 71, 72, and 73 are provided on a side surface of the support member 4, and the three links 71 to 73 are rotatably supported by a fixing plate 70. The fixing plate 70 has three support pieces 70a, 70b, and 70c rising on an identical surface and a fixing piece 70d to attach the fixing plate 70 to a case-side member 77. The first support piece 70a and the second support piece 70b are placed on an identical extension with a predetermined interval between them in an operation direction X. The third support piece 70c is placed with a predetermined interval from the first and second support pieces 70a, 70b in a crossing direction Y and with a predetermined interval from the first support piece 70a in the operation direction X.

Laterally protruding pivots 74a, 74b, and 74c are provided integrally with the three support pieces 70a, 70b, and 70c, respectively. The first pivot 74a provided with the first support piece 70a protrudes toward a side opposite to the third support piece 70c, the second pivot 74b provided with the second support piece 70b protrudes toward the third support piece 70c, and the third pivot 74c provided with the third support piece 70c protrudes toward the first support piece 70a.

The first link 71 is formed by a rectangular plate having the laterally protruding action part 44 on one edge in a longitudinal direction. The first link 71 has a fourth pivot 74d protruding toward a side opposite to the action part 44 on the other side in the longitudinal direction. A first insertion hole 75a into which the first pivot 74a is rotatably inserted is provided at a position between the fourth pivot 74d and the action part 44 and closer to the fourth pivot 74d. The second link 72 is formed by a rectangular plate. The second link 72 has a fifth pivot 74e protruding toward a side opposite to the first link 71 on one side in a longitudinal direction. The second link 72 has, on the other side in the longitudinal direction, a second insertion hole 75b into which the second pivot 74b is rotatably inserted. A third insertion hole 75c into which the second pivot 74b is rotatably inserted is provided at a position between the second insertion hole 75b and the fifth pivot 74e and closer to the fifth pivot 74e.

The third link 73 is formed by a rectangular plate having a laterally protruding arm 73a on one side in a longitudinal direction. A third holding projection 76 in contact with the brake 4b is provided on an inner surface of the arm 73a. The third link 73 has, on one side in the longitudinal direction, a fourth insertion hole 75d into which the third pivot 74c is rotatably inserted. The third link 73 has, on the other side in the longitudinal direction, a fifth insertion hole 75e into which the fifth pivot 74e is rotatably inserted.

FIGS. 17A and 17B show a state where the three links having a configuration shown in FIG. 18 are attached to the fixing plate 70. FIG. 20 shows a relation in dimension between the three links 71 to 73 and the fixing plate 70. A length from the action part 44 to the first insertion hole 75a in the first link 71 is La. A length from the first insertion hole 75a to the fourth pivot 74d is Lb. A length from the second insertion hole 75b to the third insertion hole 75c is Lc. A length from the third insertion hole 75c to the fifth pivot 74e is Ld. A length from the fourth insertion hole 75d to the fifth insertion hole 75e is Le. A length from the fourth insertion hole 75d to a rotation center Oc corresponding to the fulcrum is Lf. A length from the rotation center Oc (fulcrum) to the action part 44 is Lg.

In the support member fixing mechanism of the second example, a force $F_1$ applied downward from the brake 4b of the support member 4 is transferred from the first link 71 through the second link 72 to the third link 73. Every time the transfer occurs, an action force is increased by the level finally to a force $F_B$ fastening the brake 4b and strongly braking the support member 4.

As shown in FIG. 19, a rotation moment $M_P$ is generated in the support member 4, when a force P is applied to a place in the approximately vertically formed support 4a of the support member 4, the place above and distant by a length $L_P$ from the approximately horizontally formed brake 4b.

The rotation moment $M_P$ by the force P satisfies the following formula.

$$M_P = P \cdot L_P$$

Therefore, the force $F_1$ applied to the first link 71 satisfies the following formula.

$$F_1 = M_P/L_g = P \cdot L_P/L_g$$

Thereafter, as the force is transferred to the second link 72 and then to the third link 73, a force $F_B$ finally applied to the braking projection 76 of the third link 73 satisfies the following formula.

$$F_B = P(L_P/L_g) \times (L_a/L_b) \times (L_c/L_d) \cdot (L_e/L_f)$$

Here, the final braking force $F_B$ may be extremely large when dimension relations are respectively set to satisfy the formulas:

$$L_P > L_g,\ L_a > L_b,\ L_c > L_d,\ \text{and}\ L_e > L_f$$

FIG. 20 shows a physical operation principle in the third example of the support member fixing mechanism. The support member fixing mechanism according to the third example differs from the support member fixing mechanism according to the second example in that the third link 73 is placed below the brake 4b. Therefore, a configuration and an action in the third example are identical to those in the second example, and their description is omitted by attaching the same reference symbols. The same effect as in the aforementioned example may be achieved by employing such a configuration.

FIG. 21 shows a physical operation principle in the fourth example of the support member fixing mechanism. The support member fixing mechanism according to the fourth example differs from the support member fixing mechanism according to the second example in that the third link 73 is replaced by a pantograph link 80 and the brake 4b is held by one pair of crossing links 81a, 81b to produce a braking force. Since the support member fixing mechanism according to the fourth example is identical in configuration to the mechanism according to the second example except for the pantograph link 80, the pantograph link 80 will be described here and repeated description of the parts identical to those in the second example is omitted by attaching the same reference symbols.

The pantograph link 80 is formed by the one pair of crossing links 81a, 81b provided crossing in an X-shape and one pair of side links 82a, 82b connected to edges on one side of the one pair of crossing links 81a, 81b, respectively. The one pair of crossing links 81a, 81b are rotatably connected to each other by a rotation shaft 83 provided in a part where the links cross each other. One pair of holding projections 84a, 84b opposed inward to each other are provided on edges on one side of the one pair of crossing links 81a, 81b, respectively. Edges on one side of the one pair of side links 82a, 82b are rotatably connected to edges on the other side of the one pair of crossing links 81a, 81b by first connection shafts 85, respectively. Edges on the other side of the one pair of side links 82a, 82b overlap each other and are rotatably connected to each other by a second connection shaft 86.

The pantograph link 80 is attached to a case-side member by fixing the rotation shaft 83 to the member. A force $F_3$ from the second link 72 is acted on a position of the first rotation shaft 85 to connect the crossing links 81a, 81b to the side links 82a, 82b. The same effect as in the aforementioned example may be achieved by employing such a configuration.

Figure 22A:
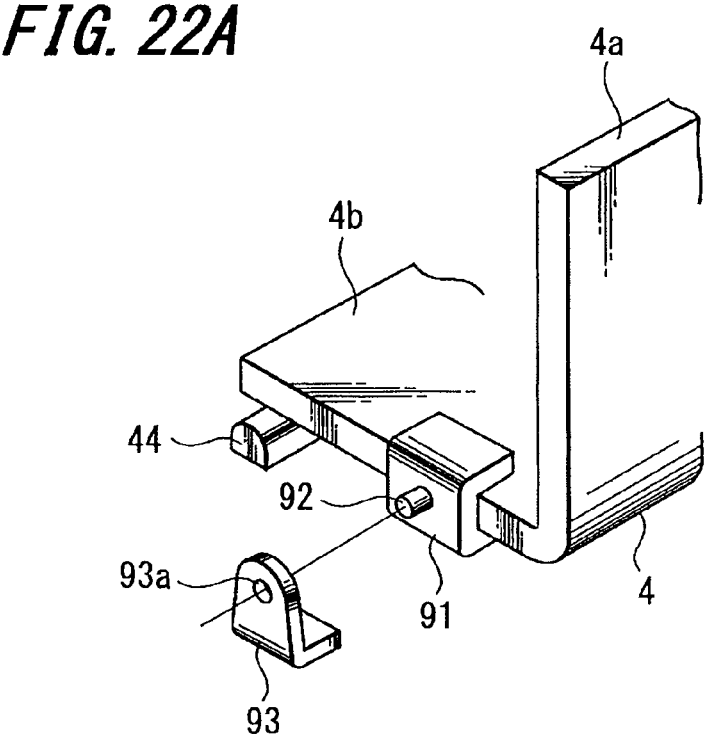
FIG. 22A is a perspective view and FIG. 22B is a side view.
Figure 22B:
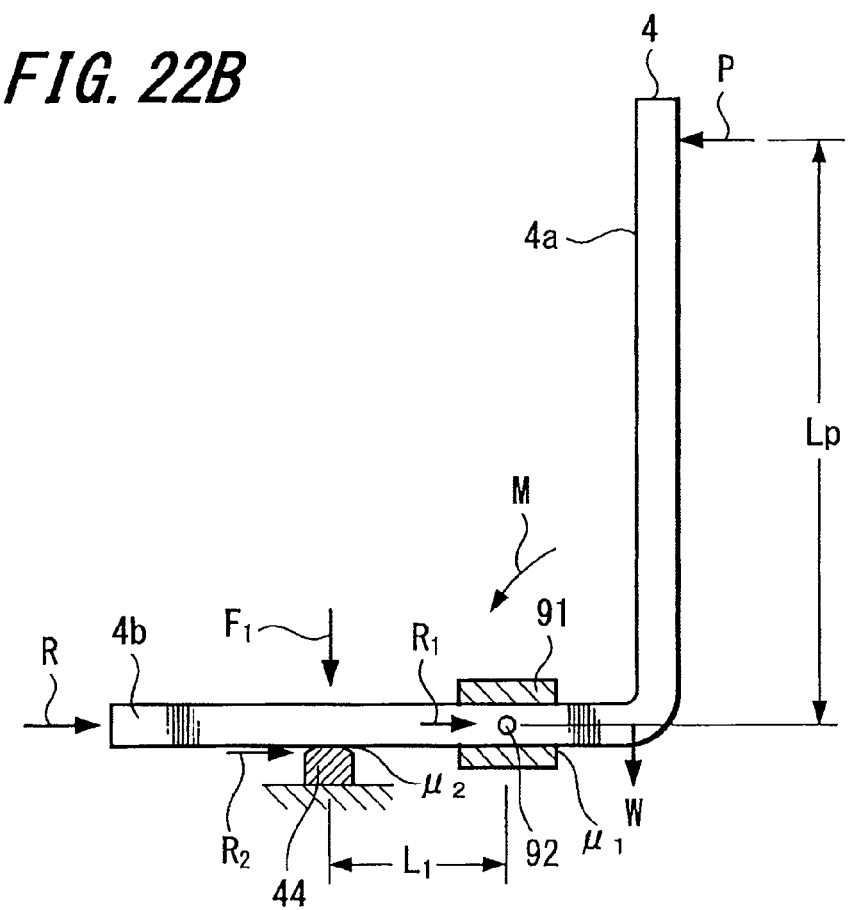

FIGS. 22A and 22B show a more simplified example of a support member fixing mechanism according to an embodiment of the invention. Since the support member fixing mechanism has a symmetrical support structure, these figures only show a configuration on a left side with a configuration on a right side omitted. A holder 91 is provided on each side of the brake 4a of the support member 4 to slidably support a periphery of the brake 4a. The holder 91 has a horizontal U-shaped cross-section and is provided with a laterally protruding rotation shaft 92 on a surface opposite to a recessed side. The rotation shaft 92 is rotatably fitted with a bearing hole 93a of a support bracket 93. The support bracket 93 is fixed to the case side member.

Here, a length from the rotation shaft to the action part 44 is $L_1$, a coefficient of friction generated between the brake 4b and the holder 91 is $\mu_1$, a sliding resistance in this part is $R_1$, a coefficient of friction generated between the brake 4b and the action part 44 is $\mu_2$, and a sliding resistance in this part is $R_2$.

Now, when an external force P is acted on the support 4a of the support member 4, a bending moment M is generated in the support member 4. Accordingly, a force $F_1$ is acted on the action parts 44 from the brake 4b. Specifically, the following formula is satisfied.

$$M = P \cdot L_P$$

Therefore, the following formula is satisfied.

$$F_1 = M/L_1 = P \cdot L_P/L_1$$

The following formula is also satisfied.

$$R_2 = \mu_2 \cdot F_1 = \mu_2 \cdot P \cdot L_P/L_1$$

Therefore, the support member 4 is stopped when $R_2$ is $\mu_2 \cdot L_P/L_1$ or more.

Accordingly, a force R to move the support member 4 satisfies the following formula.

$$R = R_1 + R_2$$

Therefore, when $R_1 \leq R_2$, $R \approx R_2$.

The same effect as in the aforementioned example may be achieved by employing such a configuration.

The following effects may be achieved according to the aforementioned examples of an embodiment of the invention.
1. Since it is not necessary to provide a guide formed by a guide shaft in part of a support member for a portable music device or the like, the degree of freedom in designing is increased, and a support member may be formed by a support and a plate integrally formed with the support.
2. A length $L_1$ of a support part in a support member for a portable music device or the like may be freely selected.
3. By designing a link mechanism, it is possible to freely select an interlocking condition and freely select a position where a support member is interlocked and stopped when actually pressed.

As described above, the cradle device 1 including the support member fixing mechanism having such an action may be used as shown in FIGS. 5 and 6, for example. FIG. 5 shows a state where the portable music player 60 is connected to the connector 17 of the cradle device 1. FIG. 6 shows a state where the portable telephone 61 having a music reproduction function is connected to the connector 17 of the cradle device 1. A cradle device according to an embodiment of the invention may also be formed integrally with electronic equipment as shown in FIG. 15. FIG. 15 shows a state where an electronic equipment support device 101 is provided integrally with a speaker device 100.

The speaker device 100 has an approximately rectangular parallelepiped box 102, and the electronic equipment support device 101 is provided on an upper surface of the box 102. Specifically, a recess 103 large enough for electronic equipment to be inserted thereinto is provided approximately centrally on a front side on the upper surface of the box 102. The connector 17 to which electronic equipment is electrically and mechanically connected is provided approximately centrally on a bottom surface of the recess 103. The support member 4 supporting electronic equipment from behind is provided on a rear surface of the recess 103 movably within a predetermined range in a longitudinal direction. The electronic equipment support device 101 has a configuration as described above.

In this example, it may not be necessary to provide the cradle device 1 or the electronic equipment support device 101 separately and independently from electronic equipment such as the speaker device 100. Therefore, usability of such a device may be improved and convenience of electronic equipment may be increased. Further, since the support member 4 is firmly fixed even when the portable music player 60 or the like is mounted and supported, an excessive force is not acted on the connector 17 even when the operation key 203 or the like of the portable music player 60 is pressed. Therefore, the connector 17 may be prevented from being broken and the operation key 203 may be pressed with good feeling.

(2) Circuit Configuration of Cradle Device

Next, a circuit configuration of the cradle device 1 will be described with reference to FIG. 14. As shown in FIG. 14, the cradle device 1 is entirely controlled by an MPU (Micro Processing Unit) 110. Electronic equipment such as the portable music player 60 or the portable telephone 61 having a music reproduction function is connected to the cradle device 1 through the first connector 17. An external device 120 formed by a video camera, a television, a personal computer, or A/V equipment such as a stereo component or a CD or magnetic tape recorder or player is connected to the cradle device 1 through the connection cable 21.

The MPU 110 of the cradle device 1 is connected to a display control part 111 and a mute circuit 112 and outputs predetermined control signals to them. The display control part 111 is connected to a display processing part 113 and outputs control signals necessary for display processing to the display processing part 113. The display processing part 113 is connected to the connection connector 17 and signals from the portable music device 60 or the like are input to the display processing part 113. The display processing part 113 is connected to a video selector 114 and supplies predetermined signals to the video selector 114. The video selector 114 is connected to the connection cable 21 and a video output terminal 115. The mute circuit 112 is connected to the connection connector 17 and the connection cable 21. Accordingly, the portable music player 60 or the portable telephone 61 having a music reproduction function is charged or a function such as music reproduction is implemented through the connector 17.

In the aforementioned example, an embodiment of the invention is a cradle device to which electronic equipment is connected through a connector; however, an embodiment of the invention may obviously an electronic equipment support device to which electronic equipment is connected by Bluetooth. The electronic equipment support device is realized by excluding the connector from the aforementioned cradle device. That is, the electronic equipment support device is realized by the aforementioned support member 4 and support member fixing mechanism 8. In this case, usable electronic equipment may need to have a function of transmitting signals by Bluetooth (a short-distance radio transmission technology).

As described above, a cradle device according to an embodiment of the invention includes: a connector to which electronic equipment such as a portable music player or a portable telephone having a music reproduction function is connected; and a support member to support a rear surface of such a portable music device, the support member movable in a longitudinal direction. Accordingly, the rear surface of the portable music device or the like may be firmly supported even when an external shape of the portable music device or the like varies or a position of the connector with respect to the external shape of the portable music device or the like varies. Therefore, in operation of an operation key, an operation button, or the like on a front surface of the portable music device or the like, oscillation of the portable music device or the like may be prevented, making it possible to improve operation feeling and prevent damage to the connector.

Further, the cradle device or the electronic equipment support device includes a brake that allows the support member to slide in a longitudinal direction with respect to an enclosure, the brake being away from the support of the support member supporting the rear surface of the portable music device or the like. Accordingly, the support member is not moved even when pressing the operation key, the operation button, or the like of the portable music device or the like, and the support member may be freely moved by operating a position of the support member near the brake when the support member is intended to be moved in the longitudinal direction. Therefore, the support member may be easily moved in the longitudinal direction without necessity of a special operation of a stopper screw or other operations such as locking and unlocking of the support member, and nevertheless the portable music device or the like may be firmly supported when operating the operation button or the like on the front surface of the portable music device or the like.

It should be understood by those skilled in the art that various modifications, combinations, sub-combinations and alterations may occur depending on design requirements and other factors insofar as they are within the scope of the appended claims or the equivalents thereof.

What is claimed is:

1. A cradle device comprising:
   a connector to which electronic equipment is electrically and detachably connected;
   a support member having a support that supports a side of the electronic equipment connected to the connector and a brake provided integrally with the support; and
   a support member fixing mechanism that supports the support member such that the support member is movable closer to or away from the electronic equipment connected to the connector and that holds the brake to prevent movement of the support member when an external force is applied to a certain region of the support,
   wherein the support member fixing mechanism includes a holding member having a first holder and a second holder rotatably connected to each other by a hinge, the first holder and the second holder are each provided with a holding projection that holds each side of the brake when the external force is applied, and one of the first holder and the second holder is provided with an action part that supports the brake at a position more distant from the support than the holding projection.

2. A cradle device according to claim 1, wherein
   the support is formed by a rising plate piece deployed to rise upward, the brake is formed by a horizontal plate piece continuous with a lower edge of the rising plate piece and deployed in a horizontal direction, the horizontal plate piece has a long hole extending in a longitudinal direction, and
   a stopper pin provided on the support member fixing mechanism is engaged with the long hole to control a direction and a quantity of movement of the support member.

3. A cradle device according to claim 1, wherein
   the support member fixing mechanism includes an elastic member that can elastically deform when sliding to contact the brake.

4. A cradle device according to claim 1, wherein
   the support member is integrally formed of engineering plastic.

5. An electronic equipment support device comprising:
   a support member having a support that supports a side of electronic equipment and a brake provided integrally with the support; and
   a support member fixing mechanism that supports the support member such that the support member is movable closer to or away from the electronic equipment and that holds the brake to prevent movement of the support member when an external force is applied to a certain region of the support,
   wherein the support member fixing mechanism includes a holding member having a first holder and a second holder rotatably connected to each other by a hinge, the first holder and the second holder are each provided with a holding projection that holds each side of the brake when the external force is applied, and one of the first holder and the second holder is provided with an action part that supports the brake at a position more distant from the support than the holding projection.

6. A cradle device according to claim 3, wherein
   the elastic member is attached to the first holder via a guide pin and the guide pin is engaged with a hole in the support member to slidably retain the support member.

7. An electronic equipment support device according to claim 5, wherein
   the support is formed by a rising plate piece deployed to rise upward, the brake is formed by a horizontal plate piece continuous with a lower edge of the rising plate piece and deployed in a horizontal direction, the horizontal plate piece has a long hole extending in a longitudinal direction, and
   a stopper pin provided on the support member fixing mechanism is engaged with the long hole to control a direction and a quantity of movement of the support member.

8. An electronic equipment support device according to claim 5, wherein
   the support member fixing mechanism includes a spring that elastically deforms when sliding to contact the brake.

9. An electronic equipment support device according to claim 8, wherein
   the spring is attached to the first holder via a guide pin and the guide pin is engaged with a hole in the support member to slidably retain the support member.

* * * * *